United States Patent
Maehara et al.

(10) Patent No.: US 7,457,238 B2
(45) Date of Patent: Nov. 25, 2008

(54) TRANSMISSION SYSTEM WITH CONGESTION STATE-BASED FLOW CONTROL

(75) Inventors: Akikazu Maehara, Yokohama (JP);
Hiroo Uchiyama, Yokohama (JP);
Yoshikazu Nozaki, Yokohama (JP);
Etsuko Yamashita, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 680 days.

(21) Appl. No.: 10/865,170

(22) Filed: Jun. 9, 2004

(65) Prior Publication Data

US 2005/0083837 A1 Apr. 21, 2005

(30) Foreign Application Priority Data

Oct. 15, 2003 (JP) ............................. 2003-354619

(51) Int. Cl.
*G06F 11/00* (2006.01)
(52) U.S. Cl. ....................................... 370/229; 370/252
(58) Field of Classification Search ................. 370/229, 370/231, 235, 236, 236.2, 252
See application file for complete search history.

(56) References Cited

U.S. PATENT DOCUMENTS

| 5,090,011 | A | * | 2/1992 | Fukuta et al. | ................ | 370/230 |
| 5,519,689 | A | * | 5/1996 | Kim | ............................. | 370/232 |
| 5,541,987 | A | * | 7/1996 | Topper et al. | ................ | 379/230 |
| 5,809,012 | A | * | 9/1998 | Takase et al. | ................ | 370/229 |
| 6,026,075 | A | * | 2/2000 | Linville et al. | ............... | 370/236 |
| 6,570,850 | B1 | * | 5/2003 | Gutierrez et al. | ............ | 370/231 |
| 6,654,342 | B1 | * | 11/2003 | Dittia et al. | .................. | 370/229 |
| 6,657,962 | B1 | * | 12/2003 | Barri et al. | .................. | 370/235 |

FOREIGN PATENT DOCUMENTS

| JP | 62-128637 | 6/1987 |
| JP | 5-103042 | 4/1993 |
| JP | 7-066820 | 3/1995 |
| JP | 10-013441 | 1/1998 |

OTHER PUBLICATIONS

Japanese Office Action without translation, dated Aug. 12, 2008, for the corresponding Japanese Patent Application JP 2003-354619.
Japanese Office Action, dated Aug. 12, 2008, for the corresponding Japanese Patent Application JP 2003-354619.

* cited by examiner

*Primary Examiner*—Frank Duong
*Assistant Examiner*—Mon Cheri S Davenport
(74) *Attorney, Agent, or Firm*—Katten Muchin Rosenman LLP

(57) ABSTRACT

A transmission system can perform flow control even if a flow control instruction is invalidated, and even when the transmission system malfunctions, it can autonomously recover to normal operation for communications. A flow control instruction sender has at least one of two functions including a normal transmission mode to send a flow control instruction for flow control over a congestion state if an event, such as the occurrence of a congestion or the removal of a congestion, occurs when a data receiver receives data, and an autonomous transmission mode to select one of a plurality of congestion states at present in each period and autonomously send a flow control instruction corresponding to the selected congestion state. The flow control instruction sender preferentially sends a flow control instruction in the normal transmission mode in which a congestion actually occurs or is actually removed, when timings of the normal transmission mode and the autonomous transmission mode coincide with each other. A flow control instruction receiver receives a flow control instruction to perform flow control by stopping sending data and sending data.

23 Claims, 22 Drawing Sheets

TRANSMISSION SYSTEM WITH CONGESTION STATE-BASED FLOW CONTROL

CROSS-REFERENCE TO RELATED APPLICATIONS

This application is based upon and claims priority of Japanese Patent Application No. 2003-354619, filed on Oct. 15, 2003, the contents being incorporated therein by reference.

BACKGROUND OF THE INVENTION (1) Field of the Invention

The present invention relates to a transmission system, and more particularly to a transmission system for transmitting signals under flow control.

(2) Description of the Related Art

In recent years, information communication networks are constructed in various many forms, and are expected to have improved communication quality and service performance in view of growing transmission capacities. Under the circumstances, loads in networks are rapidly increasing, and the importance of a flow control process for adjusting a flow of data in networks is also increasing.

The flow control process is a control process for sending data over a network to a recipient in a manner to match the reception ability of the recipient or the traffic of the network. For example, if the data transfer rate of the sender is higher than the data processing rate of the receiver, then the data transfer between the sender and the receiver is confirmed based on flow control information and performed reliably so that the data received by the receiver will not overflow the buffer of the receiver and not cause a data loss.

According to a conventional flow control process, a flow control signal indicative of data reception (XON) or no data reception (XOFF) is sent and received for flow control (see, for example, Japanese Unexamined Patent Publication No. 10-13441 (paragraphs [0016]-[0059], FIG. 2)).

There is proposed a flow control technique for limiting an inflow of cells before a buffer is congested and cells are dropped, thereby preventing cells from being dropped and retransmitted (see, for example, Japanese Unexamined Patent Publication No. 7-66820 (paragraphs [0012]-[0056], FIG. 1)).

The conventional flow control process is disadvantageous in that if data with flow control information assigned thereto suffers an error due to a fault or the like on the transmission path, then since the sender is unable to determine the contents of the flow control information, the flow control information becomes invalid, and no flow control can be performed. Furthermore, if the system is caused to malfunction by the invalidation of flow control information, then the system cannot autonomously be recovered.

Flow control information can be assigned to data in two formats, a bitmap format and an event format. The bitmap format allows flow control information to be set up for all circuits handled by the system, whereas the event format serves to set up flow control information for one circuit.

Usually, the event format is used in many occasions in order to reduce the capacity of the transmission path. However, if data flow control information assigned thereto in the event format undergoes an error, then the sender is totally unable to recognize the congestion state of the circuit, i.e., whether the circuit is in a congested state or a recovered state free of a congestion.

The reasons for the above problem are as follows: According to the event format, only when an event such as the occurrence of a congestion or the removal of a congestion occurs in a certain single circuit, flow control information for the circuit is set up and transferred to the sender. If the sender is unable to receive the flow control information properly, then the sender will subsequently have no opportunity to receive the flow control information.

Consequently, the invalidation of flow control information on account of a data transmission error has a significant impact on the event format, and has been responsible for a reduction in the transmission quality and reliability in the conventional data transmission systems.

The former conventional flow control process (Japanese Unexamined Patent Publication No. 10-13441) is a flow control process specialized in Ethernet (registered trademark) applications. The latter conventional flow control process (Japanese Unexamined Patent Publication No. 7-66820) is a flow control process effective for networks having the ring topology. Accordingly, these flow control processes are not applicable as an event-format flow control process in a wide range of data transmission tasks. In addition, the above conventional flow control processes give no consideration to effective countermeasures against errors that occur during the transmission of flow control information.

SUMMARY OF THE INVENTION

It is therefore an object of the present invention to provide a transmission system which is capable of performing flow control even if flow control information is invalidated due to a fault or the like on the transmission path, and of autonomously recovering from a malfunction to normal operation for communications, for thereby increasing transmission equality and reliability.

To achieve the above object, there is provided in accordance with the present invention a transmission system for transmitting signals under flow control. The transmission system comprises a flow control instruction sender transmission apparatus having a data receiver for receiving data and a flow control instruction sender having at least one of two functions including a normal transmission mode to send a flow control instruction for flow control over a congestion state if an event, such as the occurrence of a congestion or the removal of a congestion, occurs when the data receiver receives data, and an autonomous transmission mode to select one of a plurality of congestion states at present in each period and autonomously send a flow control instruction corresponding to the selected congestion state, the flow control instruction sender being arranged to preferentially send a flow control instruction in the normal transmission mode in which a congestion actually occurs or is actually removed, when timings of the normal transmission mode and the autonomous transmission mode coincide with each other, and a flow control instruction receiver transmission apparatus having a data sender for sending data and a flow control instruction receiver for receiving a flow control instruction to perform flow control by stopping sending data and sending data.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
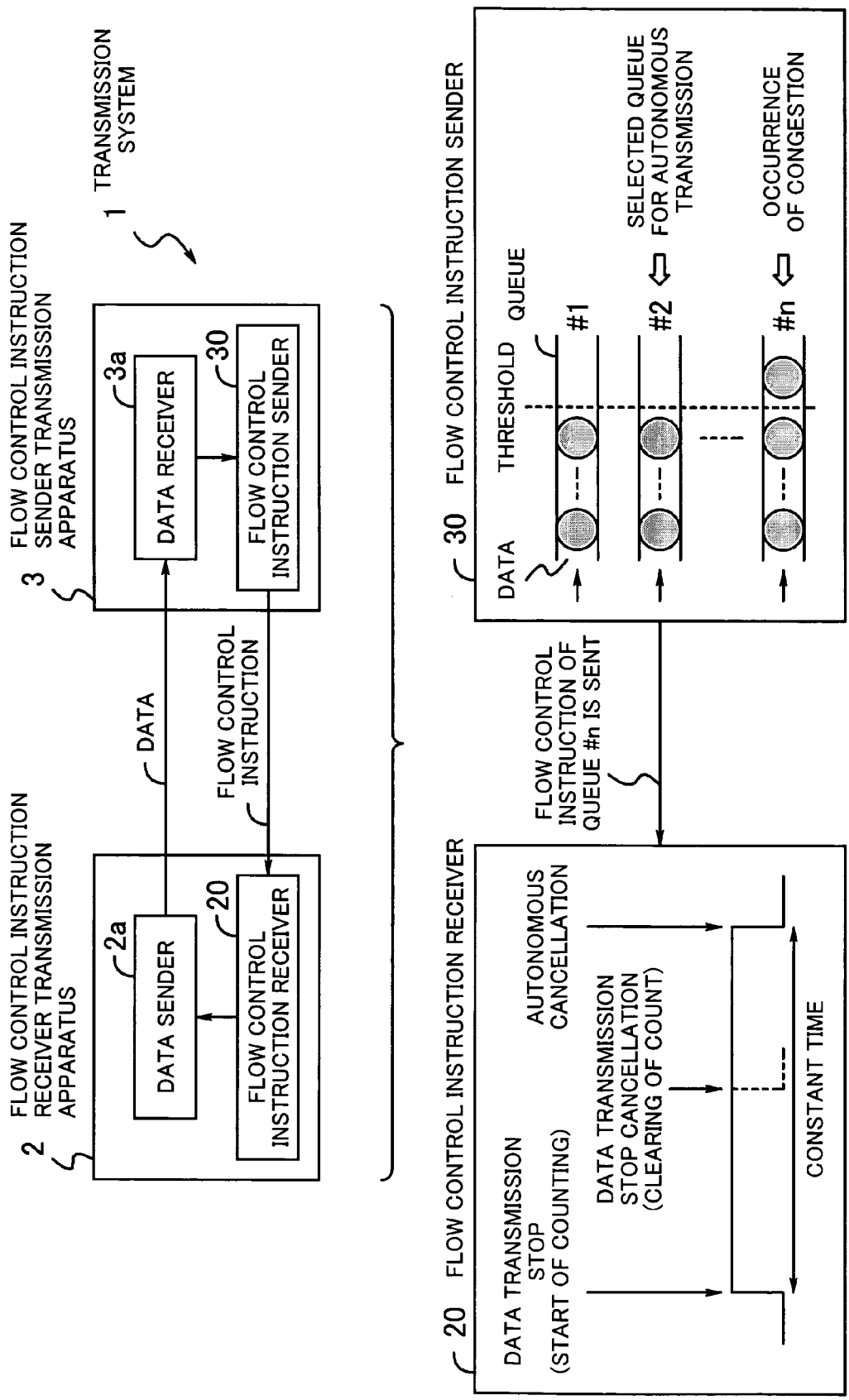
FIG. 1 is a block diagram illustrating the principles of a transmission system according to the present invention.

FIG. 1 illustrates in block form the principles of a transmission system according to the present invention. As shown in FIG. 1, a transmission system 1 comprises a flow control instruction receiver transmission apparatus 2 and a flow control instruction sender transmission apparatus 3, and transmits signals under flow control.

The flow control instruction sender transmission apparatus 3 has a data receiver 3a which receives data sent from a companion party. The flow control instruction sender transmission apparatus 3 also has a flow control instruction sender 30 having at least one of two functions, i.e., a normal transmission mode to send a flow control instruction for flow control over the congestion state if an event, such as the occurrence of a congestion or the removal of a congestion, occurs when the data receiver 3a receives data, and an autonomous transmission mode to select one of a plurality of congestion states at present in each period and autonomously send a flow control instruction corresponding to the selected congestion state.

If the flow control instruction sender 30 has the two functions, then when the timings of autonomous transmission and normal transmission modes coincide with each other, the flow control instruction sender 30 preferentially sends a flow control instruction for the congestion state in the normal transmission mode, which actually undergoes the occurrence of a congestion or the removal of a congestion.

The flow control instruction represents information for instructing the data sender to either stop sending data or send data (cancel the stoppage of sending data). For example, if the data receiver recognizes the occurrence of a congestion in a circuit #1, then the data receiver sends information including contents for stopping sending data to the circuit #1 as a flow control instruction to the data sender. The transmission system according to the present invention sends flow control instructions in the event format, not the bitmap format.

The flow control instruction receiver transmission apparatus 2 has a data sender 2a for sending data. The flow control instruction receiver transmission apparatus 2 also has a flow control instruction receiver 20 which receives a flow control instruction sent from the flow control instruction sender transmission apparatus 3 and performs flow control for stopping sending data and sending data.

If the received flow control instruction indicates the stoppage of sending data, then the flow control instruction receiver 20 activates a timer, which starts measuring time. If the flow control instruction receiver 20 does not receive a flow control instruction indicative of the cancellation of the stoppage of sending data upon elapse of a preset time as measured by the timer, then the flow control instruction receiver 20 autonomously cancels the stoppage of sending data, i.e., autonomously resumes sending data.

Operation of the flow control instruction sender 30 and the flow control instruction receiver 20 will briefly be described below with reference to FIG. 1. Details of their operation will be described later with reference to FIGS. 7 through 13. It is assumed that the flow control instruction sender 30 stores data in queues #1 through #n.

The flow control instruction sender 30 sends a flow control instruction corresponding to the congestion states of the queues #1 through #n. According to the present invention, the flow control instruction sender 30 sends a flow control instruction in one of three patterns.

According to a first pattern, when either one of the queues #1 through #n has a queue length in excess of a threshold and is congested, or when either one of the queues #1 through #n has a queue length equal to or smaller than a threshold after the occurrence of a preceding congestion and is recovered from the congestion, the flow control instruction sender 30 sends a flow control instruction corresponding to one queue to the flow control instruction receiver 20 (this pattern is referred to as a normal transmission mode according to the present invention).

According to a second pattern, one of the congestion states of the queues #1 through #n is selected in each period, and the flow control instruction sender 30 autonomously sends a flow control instruction corresponding to the selected queue to the flow control instruction receiver 20 (this pattern is referred to as an autonomous transmission mode according to the present invention).

According to a third pattern, when the timings of the autonomous transmission and normal transmission modes coincide with each other, the flow control instruction sender 30 gives priority to the normal transmission, mode and sends a flow control instruction to the flow control instruction receiver 20. For example, when the queue #2 is selected in the autonomous transmission mode and a period for sending a flow control instruction of the queue #2 is reached, if a congestion of the queue #n actually occurs and the timings of the autonomous transmission and normal transmission modes conflict with each other, then since it is more important to send the queue #n on which the event has actually occurred, the flow control instruction sender 30 preferentially sends a flow control instruction of the queue #n in the normal transmission mode.

According to the conventional flow control process for the single event format, only when an event representing a congestion state occurs, flow control information indicative of the event is transmitted. Therefore, when the receiver is unable to receive the flow control information, the flow control process cannot be performed.

According to the present invention, inasmuch as a transmission control process is performed to carry out the normal transmission mode when an event representing a congestion state occurs, carry out the autonomous transmission mode in order to indicate a congestion state at constant periodic intervals, and gives priority to the normal transmission mode when the timings of the autonomous transmission and normal transmission modes coincide with each other, even when the receiver is unable to receive the flow control information, the flow control information will subsequently be sent again, allowing the receiver to perform the flow control process reliably.

When the flow control instruction receiver 20 receives a flow control instruction of the queue #n (whose contents represent the stoppage of sending data to the queue #n), the flow control instruction receiver 20 performs a flow control process to stop sending data to the queue #n on the data sender 2a, and activates an autonomous transmission cancellation timer to start measuring time (this timer starts measuring time upon the occurrence of a congestion (when a flow control instruction to stop sending data is received) and is cleared upon the removal of a congestion (when a flow control instruction to send data is received).

Since the data sender 2a has stopped sending data to the queue #n, no data is input to the queue #n in the data receiver 3a. As data are only read successively from the queue #n, the congestion of the queue #n is eventually removed.

When the congestion of the queue #n is removed, the flow control instruction sender 30 sends a flow control instruction corresponding to the removal of the congestion (whose contents represent the sending of data to the queue #n). When the flow control instruction receiver 20 receives the flow control instruction, it controls the timer to stop measuring time, and performs flow control on the data sender 2a to start sending data to the queue #n.

If some fault occurs on the transmission path between the flow control instruction receiver transmission apparatus 2 and the flow control instruction sender transmission apparatus 3, and the flow control instruction receiver 20 is unable to properly receive a flow control instruction indicative of resumption of sending data to the queue #n, then the stoppage of sending data remains continued, tending to cause the transmission system to malfunction.

According to the present invention, a preset time is set up for the time measuring process of the timer, and if a flow control instruction indicative of the resumption of sending data to the queue #n cannot be received even when the preset time is reached, then it is assumed that the flow control instruction cannot properly be received due to some fault, and the transmission of data to the queue #n is autonomously resumed. Since the flow control instruction receiver 20 thus autonomously cancels the stoppage of sending data, it is possible to quickly recover the transmission system from a malfunction to normal operation.

Figure 2:
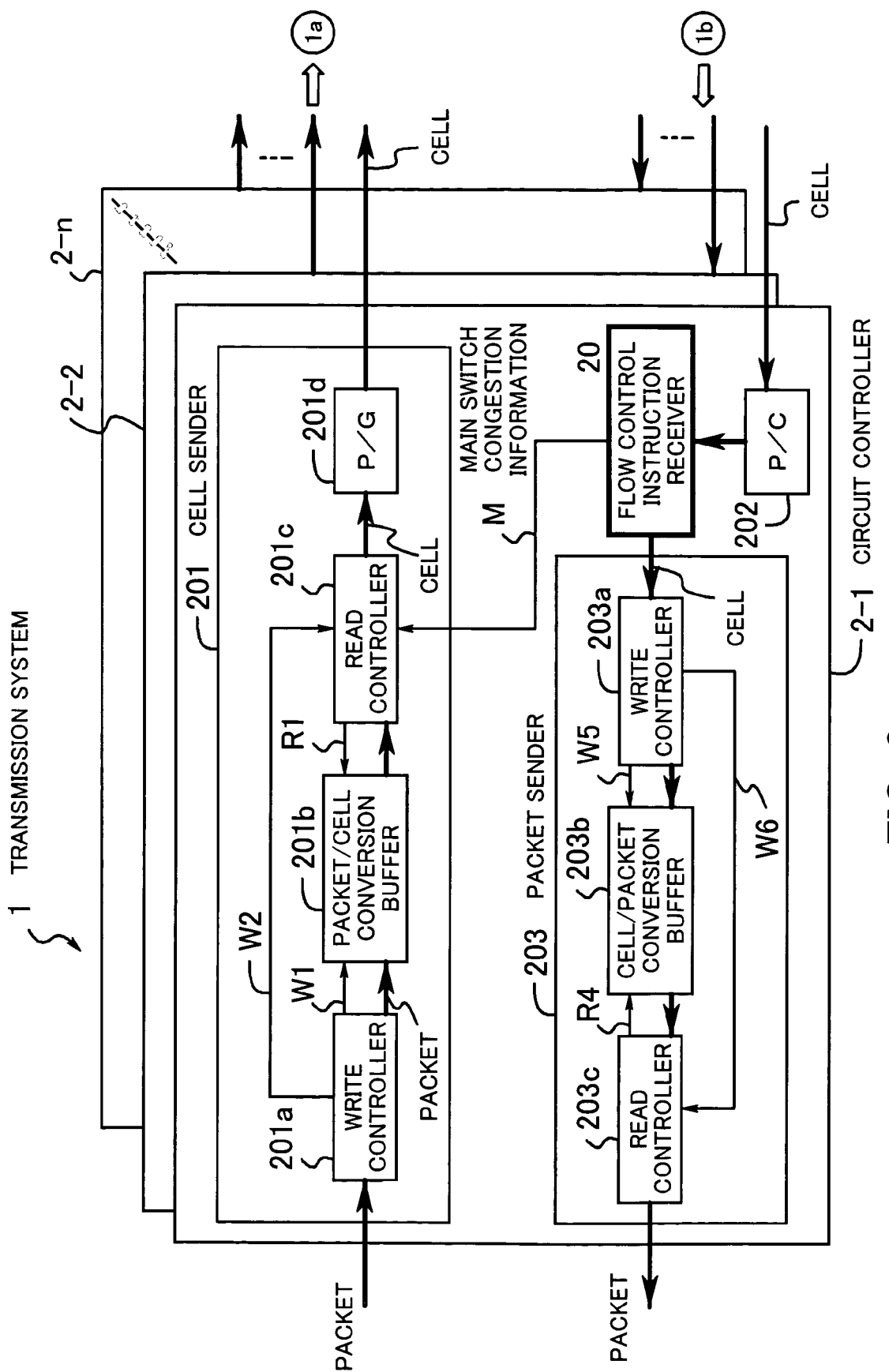
FIG. 2 is a block diagram of the transmission system.
Figure 3:
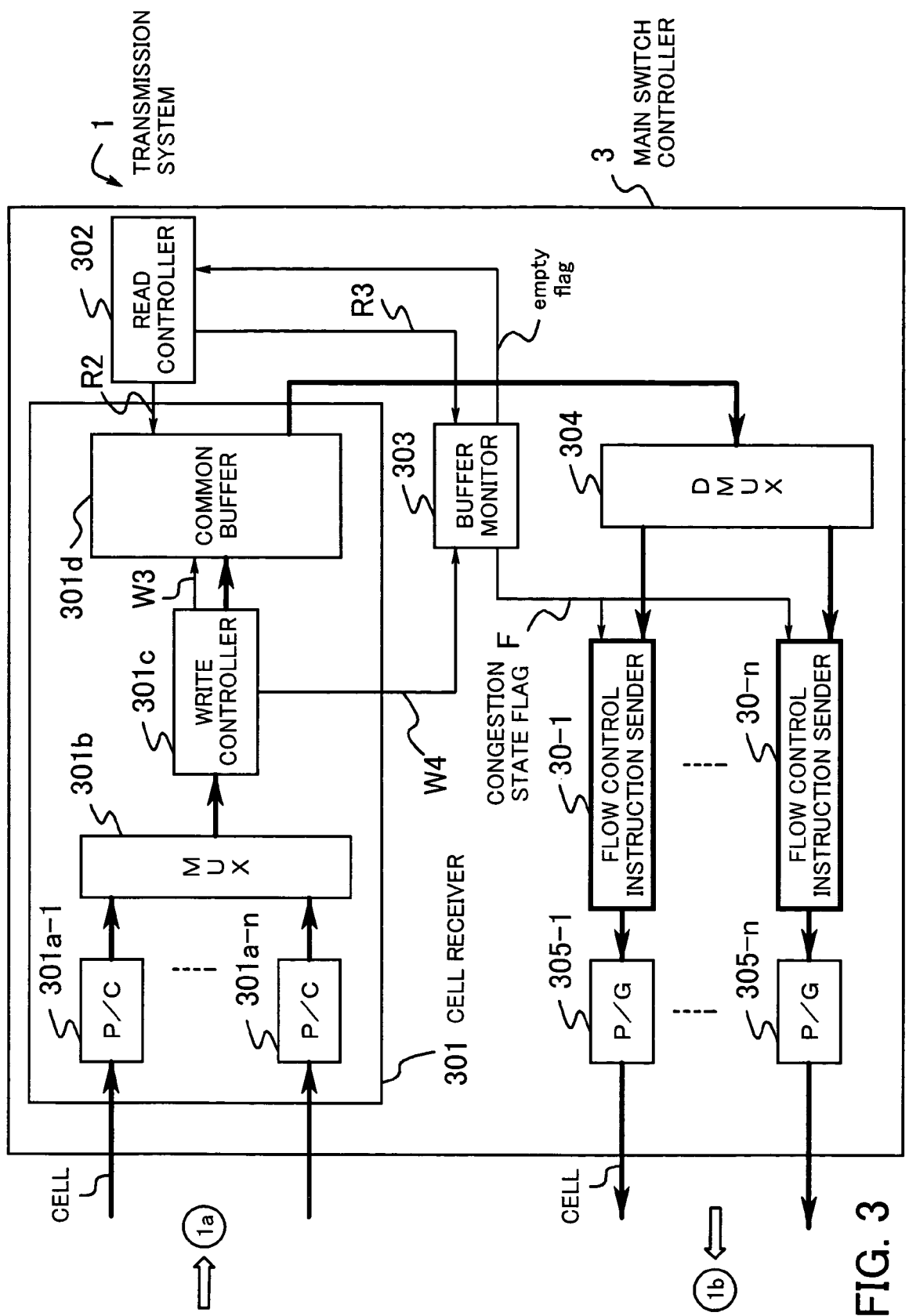
FIG. 3 is a block diagram of the transmission system.

Specific structural details of the transmission system 1 will be described below. FIGS. 2 and 3 show specific structural details of the transmission system 1. As shown in FIGS. 2 and 3, the transmission system 1 comprises circuit controllers 2-1 through 2-n (collectively referred to as circuit controller 2) and a main switch controller 3. The circuit controller 2 corresponds to the flow control instruction receiver transmission apparatus 2 and the main switch controller 3 to the flow control instruction sender transmission apparatus 3. In FIGS. 2 and 3, the thicker solid-line arrows represent main signals, and the thin solid-line arrows represent control signals.

The circuit controllers 2-1 through 2-n correspond to respective circuits, convert input packets into cells, and output the cells to the main switch controller 3 under flow control. The main switch controller 3 switches received cells, and outputs the cells switched to the circuits to the circuit controllers 2-1 through 2-n. The circuit controllers 2-1 through 2-n receive cells sent from the main switch controller 3, convert the cells into packets, and send the packets to the circuits that have been switched.

As shown in FIG. 2, each of the circuit controllers 2-1 through 2-n comprises a flow control instruction receiver 20, a cell sender 201, a P/C (parity checker) 202, and a packet sender 203. The cell sender 201 comprises a write controller 201a, a packet/cell conversion buffer 201b, a read controller 201c, and a P/G (parity generator) 201d. The packet sender 203 comprises a write controller 203a, a cell/packet conversion buffer 203b, and a read controller 203c.

As shown in FIG. 3, the main switch controller 3 comprises flow control instruction senders 30-1 through 30-n, a cell receiver 301, a read controller 302, a buffer monitor 303, a DMUX (demultiplexer) 304, and P/Gs 305-1 through 305-n. The cell receiver 301 includes P/Cs 301a-1 through 301a-n, a MUX (multiplexer) 301b, a write controller 301c, and a common buffer 301d.

In the circuit controllers 2-1 through 2-n shown in FIG. 2, the write controller 201a performs a write control process for writing an input variable-length packet into the packet/cell conversion buffer 201b to convert the variable-length packet into fixed-length cells. The write controller 201a generates a write control signal W1 such as write enable, write address, etc. When the writing of one packet of data is completed, the write controller 201a generates and sends a writing completion notice W2 including a packet length, queue information (queue number), etc.

Queues will be described below. If a queue is regarded as a physical storage area, then a buffer has a plurality of physical storage areas corresponding to respective circuits, and each of the physical storage areas serves as a queue. Queue information in this case represents an identifier of each of the physical storage areas.

If a queue is regarded as a logical data storage area, then a buffer does not have a plurality of physical storage areas corresponding to respective circuits, but has only one storage area in which queues correspond to logical storage areas corresponding to respective circuits. In this case, queue information may be regarded as circuit numbers (specifically, the circuit numbers that have been switched by the main switch controller 3 (the numbers of the output lines of P/G 305-1 through 305-n)).

The present invention may be based on either one of the above queue concepts. However, a queue will subsequently refer to a logical queue (queues are indicated as physical ones in FIG. 1 for illustrative purposes).

The read controller 201c performs a read control process on the packet/cell conversion buffer 201b in order to convert packets into cells. When the read controller 201c receives a writing completion notice W2 from the write controller 201a, if there is a packet existing in the packet/cell conversion buffer 201b, then the read controller 201c reads data from the packet/cell conversion buffer 201b while comparing data quantities that can be stored in the payloads of cells based on the length information. At this time, the read controller 201c generates a read control signal R1 such as read enable, read address, etc.

The read controller 201c assigns the read data to the payloads of cells. When the reading of the data to be assigned to the payloads of cells is completed, the read controller 201c assigns queue information and information as to the positions (starting and final, starting/middle/final) of the data in the packet to the headers of cells (The length information of the packet is assigned to the payload area of an final cell or the payloads of starting and final cells). In this manner, a packet is converted into cells.

If the flow control instruction receiver 20 indicates the contents of the stoppage of sending data as main switch congestion information M, then the read controller 201c does not read data from the packet/cell conversion buffer 201b, but stops outputting cells to the main switch controller 3.

Figure 4:
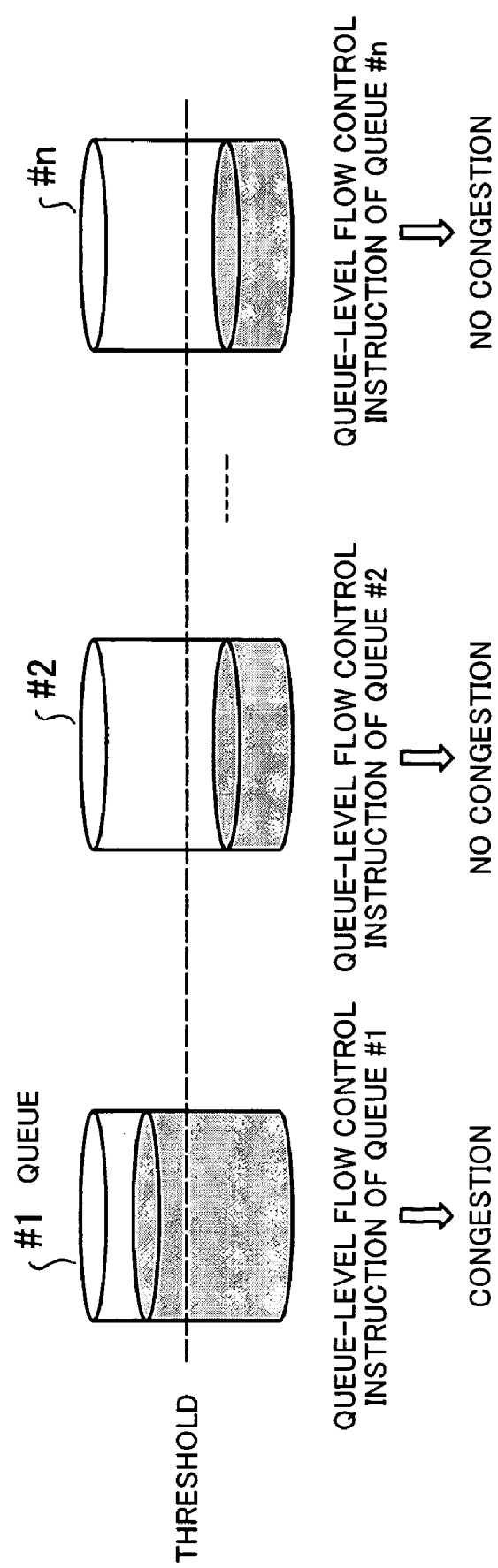
FIG. 4 is a diagram illustrating the congestion states of queue levels.
Figure 5:
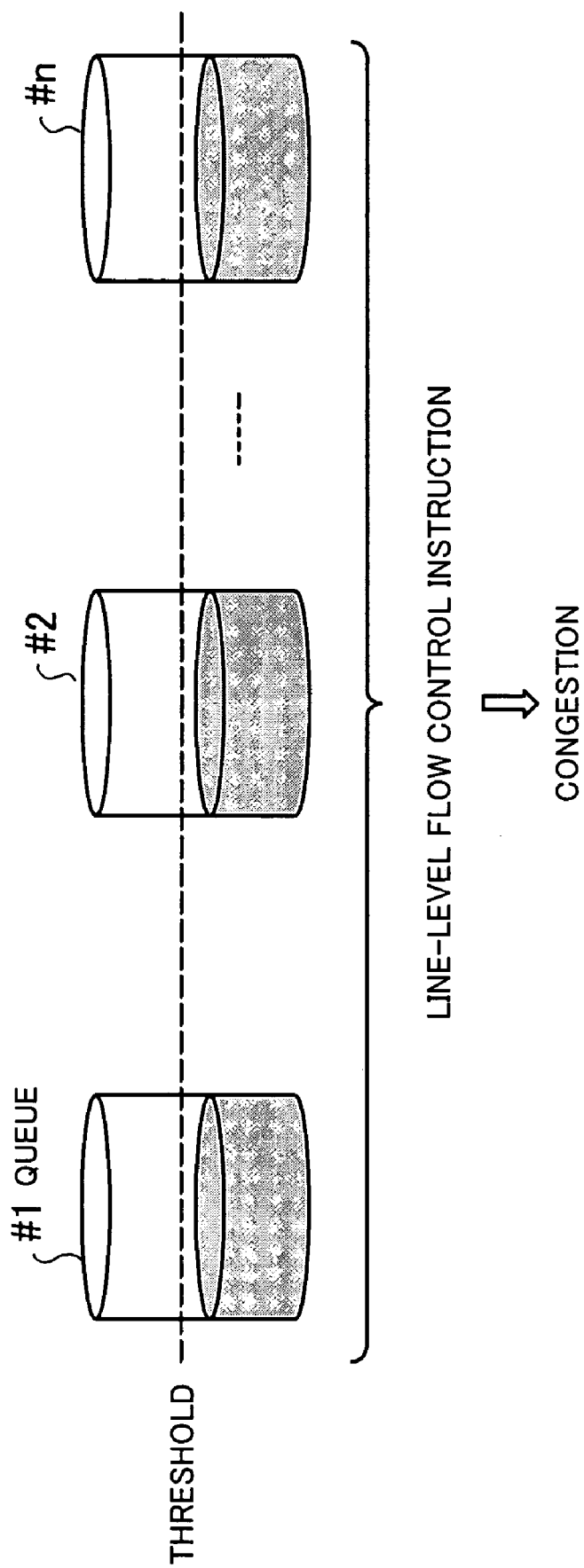
FIG. 5 is a diagram illustrating the congestion state of a line level.

The indicated contents of the main switch congestion information M, i.e., the contents of a flow control instruction, include two types of contents, i.e. the congestion states of queue levels and the congestion state of a line level. FIG. 4 illustrates the congestion states of queue levels, and FIG. 5 illustrates the congestion state of a line level. In FIGS. 4 and 5, queues are shown as physical queues for illustrative purposes.

In FIG. 4, the congestion states of queue levels each indicate the congestion state of a single queue, i.e., whether an individual queue is congested or not, if there are n queues #1 through #n (there are n circuits).

With respect to the queue levels of the queues #1 through #n shown in FIG. 4, a flow control instruction for the queue level of the queue #1 represents that there is a congestion, a flow control instruction for the queue level of the queue #2 represents that there is no congestion, and a flow control instruction for the queue level of the queue #n represents that there is no congestion.

In FIG. 5, the congestion state of a line level indicates the congestion state of all queues #1 through #n. As shown in FIG. 5, there is no congestion occurring in each of the queues #1 through #n. The amounts of data stored in the respective queues are below, but close to, a threshold, and the queues #1 through #n in combination store a substantial amount of data. The congestion state of a line level refers to such a situation, i.e., the storage of a substantial amount of data in the queues #1 through #n in combination. In FIG. 5, a flow control instruction for the line level represents that there is a congestion.

Since the transmission system according to the present invention sends flow control instructions in the event format, either one of a total of (n+1) flow control instructions, i.e., the flow control instructions for the queue levels of the queues #1 through #n and the flow control instructions for the line level, is sent (received).

Referring back to FIG. 2, if the read controller 201c receives main switch congestion information M indicating that there is a line-level congestion, then the read controller 201c completely stops reading data from the packet/cell conversion buffer 201b. If the read controller 201c receives main switch congestion information M indicating that there is a queue-level congestion, then the read controller 201c stops reading data of the corresponding queue from the packet/cell conversion buffer 201b. The P/G 201d adds a parity bit to a generated cell and sends the cell with the added parity bit to the main switch controller 3.

In the main switch controller 3 shown in FIG. 3, the P/Cs 301a-1 through 301a-n perform a parity check on cells sent from the circuit controllers 2-1 through 2-n. If the P/Cs 301a-1 through 301a-n detect a parity error in a cell, the P/Cs 301a-1 through 301a-n assign a fault detection flag to the header of the cell and drop the cell.

The MUX 301b multiplexes cells sent over the circuits for increased switching efficiency. The write controller 301c performs a write control process for temporarily storing multiplexed cells in the common buffer 301d. The write controller 301c generates a write control signal W3 such as write enable, write address, etc. The write controller 301c also generates and sends a writing completion notice W4 including queue information, etc. when the writing of one cell is completed.

The read controller 302 performs a read control process on the common buffer 301d. Specifically, the read controller 302 refers to an empty flag of each queue which is sent from the buffer monitor 303, performs a scheduling control process (e.g., to change a reading sequence to read cells from the common buffer 31d depending on whether the priority of cells is high or low), and determines which queue cells are to read from. The read controller 302 generates a read control signal R2 such as read enable, read address, etc. The read controller 302 also generates and sends a reading completion notice R3 including queue information, etc. when the reading of one cell is completed.

The buffer monitor 303 performs an addition/subtraction process based on the writing completion notice W4 and the reading completion notice W3, and monitors the number of buffered cells of each queue within the common buffer 301d. The buffer monitor 303 generates an empty flag of each queue from the monitored number of buffered cells, and also generates line-level/queue-level congestion state flags F by comparing the number of buffered cells with a congestion threshold that is set up by an upper-level system such as upper-level software.

The DEMUX 304 demultiplexes multiplexed cells read from the common buffer 301d into cells for the circuits. The flow control instruction senders 30-1 through 30-n refer to the congestion state flags F, and assign flow control instructions to the cell headers of the demultiplexed cells (since the flow control information is in the event format, either one of the flow control instructions for the queue levels of the queues #1 through #n and the flow control instructions for the line level is assigned to one cell header). The P/Gs 305-1 through 305-n generate and assign a parity bit to each of the cells to which the flow control instructions are assigned, and send the cell data to the circuit controllers 2-1 through 2-n shown in FIG. 2.

In each of the circuit controllers 2-1 through 2-n, the P/C 202 performs a parity check on cells sent from the main switch controller 3. If the P/C 202 detects a parity error in a cell, the P/C 202 assigns a fault detection flag to the header of the cell, and clears (invalidates) the flow control instruction and drops the cell.

The flow control instruction receiver 20 extracts a flow control instruction from a cell, and generates main switch congestion information M. After having extracted a flow control instruction from a cell, the flow control instruction receiver 20 clears the flow control instruction assigned to the cell header.

The write controller 203a performs a write control process for writing cells into the cell/packet conversion buffer 203b which converts cells into packets. The write controller 203a refers to queue information of cells and information as to the positions (starting and final, starting/middle/final) of the data in a packet, assembles the packet, and writes only real data of the packet into the cell/packet conversion buffer 203b. At this time, the write controller 203a generates a write control signal W5 such as write enable, write address, etc. When the writing of one packet of data is completed, the write controller 203a generates and sends a writing completion notice W6 including a packet length, queue information, etc.

The read controller 203c performs a read control process for reading packets from the cell/packet conversion buffer 203b which converts cells into packets. The read controller 203c manages length information, queue information, etc. sent from the write controller 203a. If there is a packet existing in the cell/packet conversion buffer 203b, then the read controller 203c reads as many packet data as represented by the length information from the cell/packet conversion buffer 203b. At this time, the read controller 203c generates a read control signal R4 such as read enable, read address, etc. The read packet is sent to the circuit.

Prior to describing details of the flow control instruction sender 30 and the flow control instruction receiver 20, problems to be solved by the present invention will be described in detail below with respect to an example of the format of a flow control instruction. If a parity error is detected in a cell with a flow control instruction assigned thereto, due to a fault on the transmission path, then the flow control instruction is invalidated and no flow control process can be performed. If a parity check for error correction suffers a bit flip, then the parity check is unable to detect an error, and at this time the receiver of flow control instructions recognizes in error that a flow control instruction has been assigned, possibly causing a malfunction.

Figure 6:
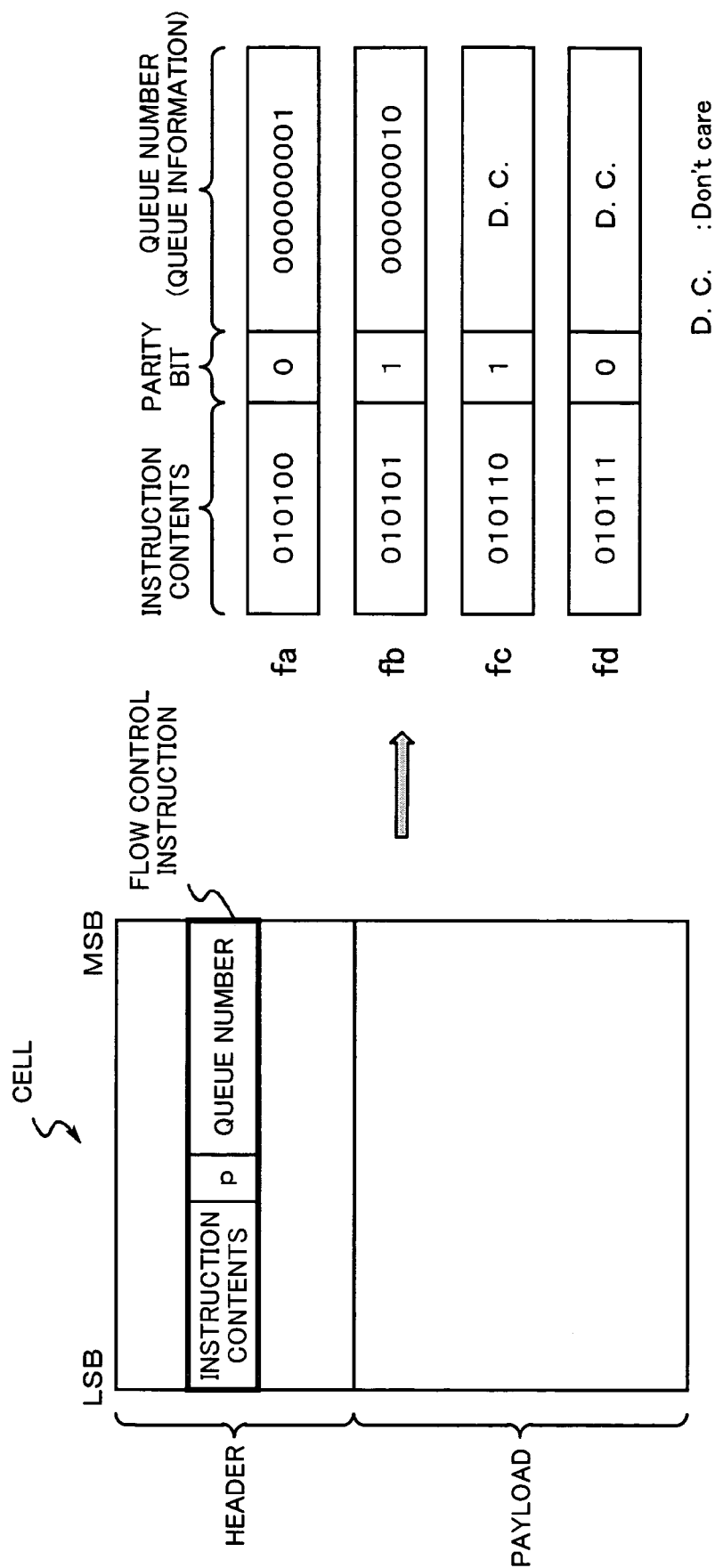
FIG. 6 is a diagram of an example of the format of a flow control instruction.

FIG. 6 shows an example of the format of a flow control instruction. A cell comprises a header including control information and a payload including a main signal. A flow control instruction is included in the header. The flow control instruction comprises three fields, i.e., an instruction content, a parity bit, and a queue number.

Flow control instructions fa, fb are flow control instructions corresponding to queue-level congestion states. If the instruction content represents "010100", then it means the stoppage of sending cell data of the corresponding queue, and if the instruction content represents "010101", then it means sending cell data of the corresponding queue. The flow control instruction fa means the stoppage of sending cell data of the queue #1, and the flow control instruction fb means sending cell data of the queue #2.

Flow control instructions fc, fd are flow control instructions corresponding to line-level congestion states. If the instruction content represents "010110", then it means the stoppage of sending cell data of all the queues, and if the instruction content represents "010111", then it means sending cell data of all the queues. The flow control instruction fc means the stoppage of sending cell data of all the queues #1 through #n, and the flow control instruction fd means sending cell data of all the queues #1 through #n.

The parity bit is provided as one redundant bit allocated to the instruction content. If the number of 1's (or 0's) in the field of the instruction content is even, the parity bit is set to 0, and if the number of 1s (or 0s) in the field of the instruction content is odd, the parity bit is set to 1 (for example, the number of 1s in the instruction content of the flow control instruction fa is two, and a parity bit allocated to the flow control instruction fa is set to 0).

It is assumed that when the receiver effects a parity check on the flow control instruction fa, 1 is detected in the parity bit of the flow control instruction fa. If 1 is detected in the parity bit though the number of 1s in the instruction content of the flow control instruction fa is even, then since a bit flip has occurred in the transmission of the cell, the flow control instruction fa is regarded as being low in reliability and invalidated. In this case, because the flow control instruction of the queue #1 is not resent, no flow control can subsequently be performed on the queue #1.

If an even number of bits in an instruction content suffer a bit flip, then the parity check is unable to detect a parity error. For example, if two bits of the instruction content "010100" of the flow control instruction fa are flipped, turning the instruction content into "010111", then since the number of 1s in the instruction content is even, the receiver regards the flow control instruction fa as normal, and is unable to detect the error (in this case, the flow control instruction fa which represents the stoppage of sending data of the queue #1 is erroneously recognized as a flow control instruction corresponding to a line-level congestion state for sending cell data of all the queues).

The transmission system according to the present invention is designed to solve the above problems. Even when a bit flip occurs in a flow control instruction due to a fault or the like on the transmission path, the transmission system makes it possible to perform a subsequent flow control process. Even after the transmission system malfunctions, it autonomously recovers from the malfunction to normal operation for communications, for thereby increasing transmission equality and reliability.

Figure 7:
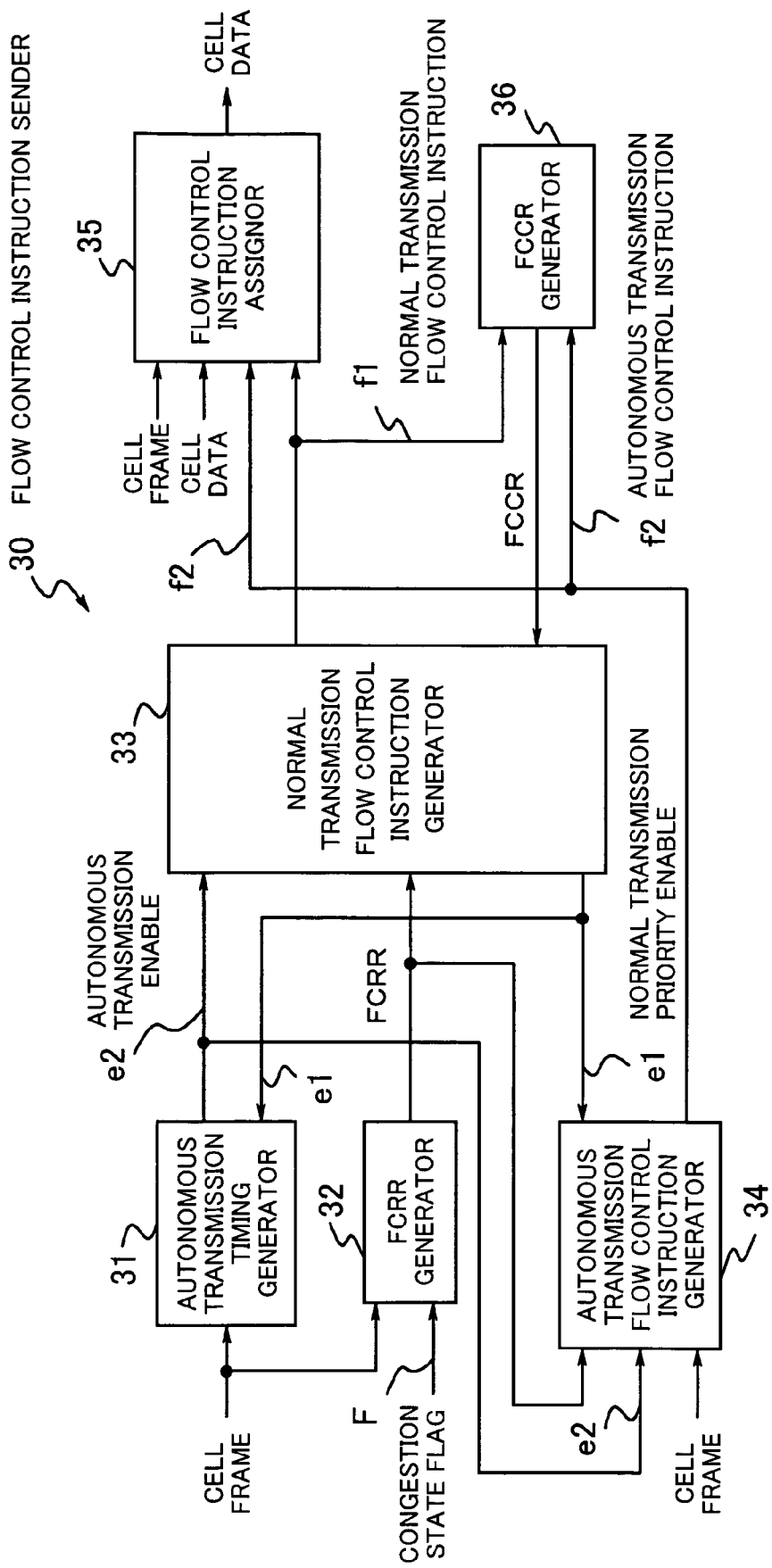
FIG. 7 is a block diagram of an arrangement of a flow control instruction sender.

An arrangement and operation of the flow control instruction sender 30 will be described in detail below. FIG. 7 shows in block form an arrangement of the flow control instruction sender 30. As shown in FIG. 7, the flow control instruction sender 30 comprises an autonomous transmission timing generator 31, an FCRR (Flow Control Request Register) generator 32, a normal transmission flow control instruction generator 33, an autonomous transmission flow control instruction generator 34, a flow control instruction assignor 35, and FCCR (Flow Control Current Register) generator 36.

The autonomous transmission timing generator 31 monitors a period at which to autonomously send a flow control instruction, and generates an autonomous transmission enable e2. The autonomous transmission enable e2 is generated by operating a counter in the autonomous transmission timing generator 31 based on a cell frame and comparing the count of the counter with a preset period value that is set up by the upper-level system.

For example, it is assumed that the preset period value is set to a 64-cell frame time. The autonomous transmission timing generator 31 controls the counter to count up for each cell frame and waits until the count of the counter reaches the preset period value. When 64 cells have arrived, the count of the counter is 64. At this time, the condition of the count ≧ the preset period value is met. The autonomous transmission timing generator 31 makes the autonomous transmission enable e2 valid (e.g., sets it to "H") during a cell interval in which the above condition is met. In a next cell frame after the condition is met, the autonomous transmission timing generator 31 loads 1 into the counter. If the autonomous transmission enable e2 is valid and a normal transmission priority enable e1 sent from the normal transmission flow control instruction generator 33 is invalid, then the autonomous transmission timing generator 31 loads 1 into the counter.

If the normal transmission priority enable e1 is valid, then the autonomous transmission timing generator 31 loads the count of the counter into the value of the preset period value, and, as a result, sends the autonomous transmission enable e2 from a next cell frame time (as will be described later with reference to FIG. 13).

The FCRR generator 32 is a register for holding congestion state flags F sent from the buffer monitor 303 shown in FIG. 3. Specifically, the FCRR generator 32 latches the line-level congestion state flag and n queue-level congestion state flags, and outputs latched flag information (referred to as FCRR in the present invention)

The normal transmission flow control instruction generator 33 performs its processing in each normal transmission period (one cell frame). Specifically, the normal transmission flow control instruction generator 33 determines a queue or a line to be held under flow control based on FCRR, and compares the values of FCRR and FCCR with each other (since the FCCR represents the value of FCRR in a preceding period, it is determined whether an event has occurred or not by comparing the value of FCCR with the value of FCRR which has been acquired in the present normal transmission period. If the value of FCCR is different from the value of FCRR, then it is judged that an event has occurred).

In the normal transmission mode, the normal transmission flow control instruction generator 33 selects a congestion state where the values of FCRR and FCCR disagree with each other, and generates a normal transmission flow control instruction f1 (as will be described later with reference to FIGS. 9 through 12). If the autonomous transmission enable e2 is valid, indicating that no event occurs, then the normal transmission flow control instruction generator 33 stops its operation. If the autonomous transmission enable e2 is invalid, indicating that an event has occurred, then the normal transmission flow control instruction generator 33 makes the normal transmission priority enable e1 valid and sends the normal transmission priority enable e1.

The autonomous transmission flow control instruction generator 34 performs its processing in each autonomous transmission period (e.g., 64-cell frame time) Only if the autonomous transmission enable e2 is valid and the normal transmission priority enable e1 is invalid, the autonomous transmission flow control instruction generator 34 operates (stops its operation if the normal transmission priority enable e1 is valid), and generates an autonomous transmission flow control instruction f2 based on FCRR (in the autonomous transmission mode, the autonomous transmission flow control instruction generator 34 successively selects values of FCRR to determine a queue or a line, and hence does not employ FCCR for generating an autonomous transmission flow control instruction).

The flow control instruction assignor 35 recognizes either the normal transmission flow control instruction f1 or the autonomous transmission flow control instruction f2 in each cell frame, assigns the flow control instruction to the header of a cell, and sends the cell data with the flow control instruction assigned thereto to the P/Gs 305-1 through 305-n shown in FIG. 3. The FCCR generator 36 receives the normal transmission flow control instruction f1 and the autonomous transmission flow control instruction f2, and outputs data indicative of whether a flow control instruction including the contents of the stoppage of sending data has been sent or not.

According to the present invention, the data output by the FCCR generator 36 is referred to as FCCR. FCCR represents data of the recorded congestion state of a preceding queue or line based on the normal transmission flow control instruction f1 or the autonomous transmission flow control instruction f2.

Figure 8:
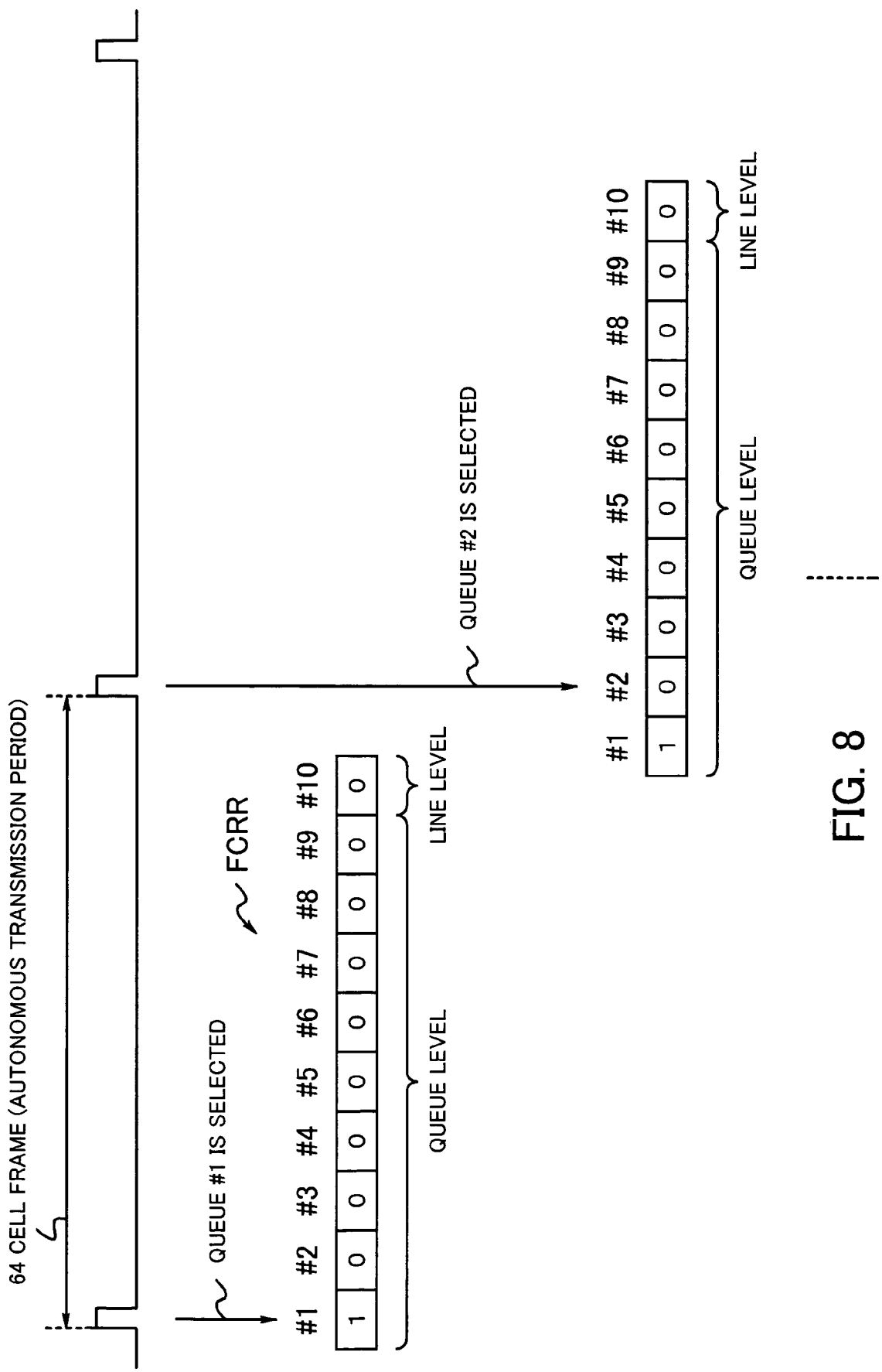
FIG. 8 is a diagram illustrating how an autonomous transmission flow control instruction generator operates.

FIG. 8 illustrates how the autonomous transmission flow control instruction generator 34 operates. The autonomous transmission flow control instruction generator 34 selects one flag from FCCR when the autonomous transmission enable e2 is valid. For example, when FCRR is of 10 bits, the 1st through 9th bits representing flags of the congestion states of queues #1 through #9 and the 10th bit representing a flag of the congestion state of a line (1 indicating a congestion and 0 no congestion), the autonomous transmission flow control instruction generator 34 cyclically selects these bits one bit at a time.

In FIG. 8, the autonomous transmission flow control instruction generator 34 selects the first bit of FCRR in the first autonomous transmission period. Since the first bit is a bit representative of the congestion state of the queue #1, and indicating a congestion, the autonomous transmission flow control instruction generator 34 generates an autonomous transmission flow control instruction f2 indicative of the stoppage of sending data to the queue #1.

In the next autonomous transmission period, the autonomous transmission flow control instruction generator 34 selects the second bit of FCRR. Since the second bit is a bit representative of the congestion state of the queue #2, and indicating no congestion, the autonomous transmission flow control instruction generator 34 generates an autonomous transmission flow control instruction f2 indicative of sending data to the queue #2. Thereafter, the autonomous transmission flow control instruction generator 34 repeats the above process.

For the autonomous transmission mode, therefore, the autonomous transmission flow control instruction generator 34 cyclically selects the bits of FCRR in respective autonomous transmission periods, and periodically generates and sends flow control instructions in the respective autonomous transmission periods.

Figure 9:
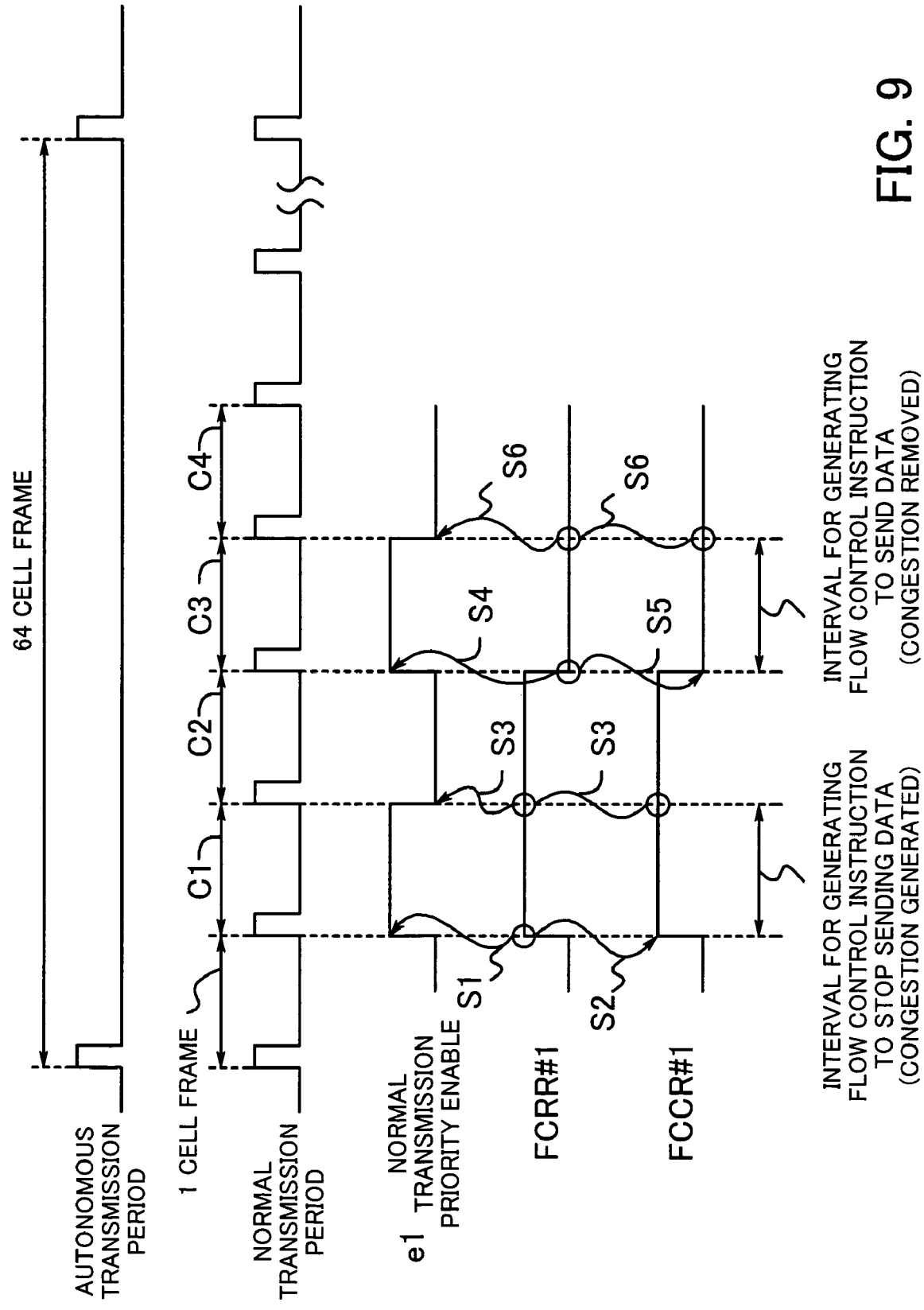
FIG. 9 is a diagram illustrating how a flow control instruction is generated based on FCRR and FCCR.

Flow control instruction generating processes based on FCRR and FCCR will be described below with reference to FIGS. 9 through 12. FIG. 9 is a timing chart of a flow control instruction generating process in the normal transmission mode at the time one event has occurred.

The normal transmission flow control instruction generator 33 monitors FCRR sent from the FCRR generator 32 in each normal transmission period (one cell frame). It is assumed that a congestion of a queue #1 is detected in a cycle C1, i.e., 1 ("H") is set in the bit of FCRR which represents the queue #1 (FCRR at the bit of the queue #1 is indicated as FCRR#1). At the time the congestion is detected, FCCR of the queue #1 (indicated as FCCR#1) sent from the FCCR generator 36 is 0 ("L") as an initial state.

[S1] In the cycle C1, the normal transmission flow control instruction generator 33 compares the level of FCRR#1 and the level of FCCR#1 with each other to ascertain whether those levels are in conformity with each other. If the level of FCRR is "H" and the level of FCCR is "L" (an event where a congestion is caused has occurred), then the normal transmission flow control instruction generator 33 generates a flow control instruction meaning the stoppage of sending data. Therefore, the normal transmission flow control instruction generator 33 generates a flow control instruction indicative of the occurrence of a congestion of the queue #1. The normal transmission flow control instruction generator 33 also makes the normal transmission priority enable e1 valid ("H").

[S2] When the FCCR generator 36 receives the flow control instruction and recognizes that the received flow control instruction has contents indicative of the stoppage of sending data to the queue #1, the FCCR generator 36 sets the FCCR#1 to "H".

If the level of FCCR is "H" when a congestion occurs and "L" when no congestion occurs, then when the normal transmission flow control instruction generator 33 (or the autonomous transmission flow control instruction generator 34) outputs a flow control instruction meaning that data transmission be stopped, FCCR becomes "H", and when the normal transmission flow control instruction generator 33 (or the autonomous transmission flow control instruction generator 34) outputs a flow control instruction meaning that data be transmitted, FCCR becomes

[S3] In a cycle C2, the congestion of FCRR#1 still continues. The normal transmission flow control instruction generator 33 compares the levels of FCRR#1 and FCCR#1 with each other. Since both the levels of FCRR#1 and FCCR#1 are "H" and are of the same value, the normal transmission flow control instruction generator 33 does not generate a flow control instruction with respect to the queue #1, and makes the normal transmission priority enable e1 invalid ("L"). Since the FCCR generator 36 does not receive a new flow control instruction of FCRR#1 (a new event has not occurred), the FCCR generator 36 keeps FCCR#1 unchanged, i.e., it remains to be "H".

[S4] In a cycle C3, the normal transmission flow control instruction generator 33 monitors FCRR#1 and recognizes that it is "L" and the congestion is removed. The normal transmission flow control instruction generator 33 compares the levels of FCRR and FCCR with each other. When the level of FCRR is "L" and the level of FCCR is "H" (an event where the congestion is removed has occurred), the normal transmission flow control instruction generator 33 generates a flow control instruction meaning sending data. Therefore, the normal transmission flow control instruction generator 33 generates a flow control instruction indicative of the removal of the congestion of (sending data to) the queue #1. The normal transmission flow control instruction generator 33 also makes the normal transmission priority enable e1 valid ("H")

[S5] When the FCCR generator 36 receives the flow control instruction generated in step S4 and recognizes that the received flow control instruction has contents indicative of sending data to the queue #1, the FCCR generator 36 sets the FCCR#1 to "L".

[S6] In a cycle C4, the congestion of FCRR#1 does not occur. The normal transmission flow control instruction generator 33 compares the levels of FCRR#1 and FCCR#1 with each other. Since both the levels of FCRR#1 and FCCR#1 are "L" and are of the same value (no event has occurred), the normal transmission flow control instruction generator 33 does not generate a flow control instruction with respect to the queue #1, and makes the normal transmission priority enable e1 invalid ("L"). Since the FCCR generator 36 does not receive a new flow control instruction of FCRR#1 (a new event has not occurred), the FCCR generator 36 keeps FCCR#1 unchanged, i.e., it remains to be "L".

Figure 10:
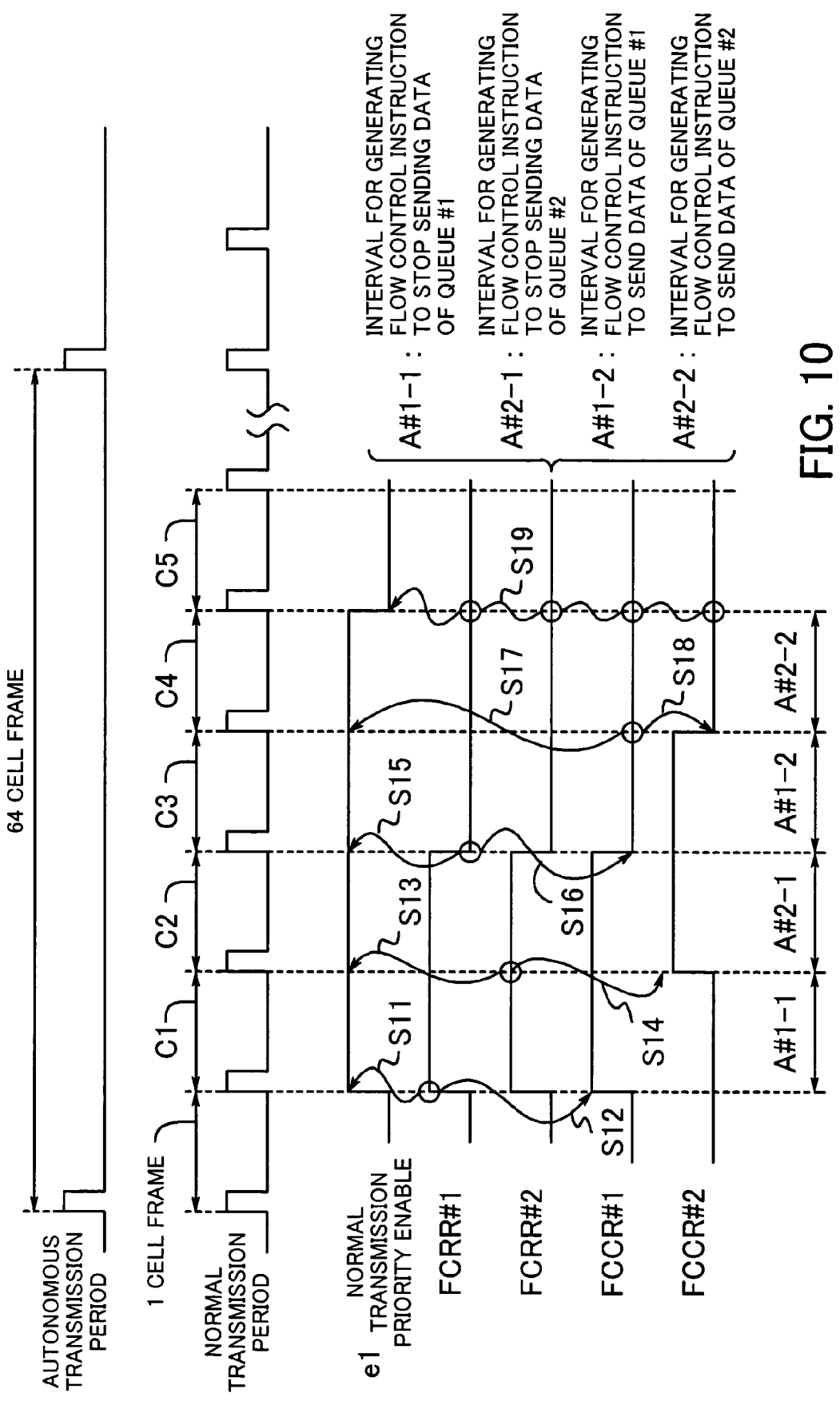
FIG. 10 is a diagram illustrating how a flow control instruction is generated based on FCRR and FCCR.

FIG. 10 is a timing chart of a flow control instruction generating process in the normal transmission mode at the time two events have simultaneously occurred. The normal transmission flow control instruction generator 33 monitors FCRR sent from the FCRR generator 32 in each normal transmission period (one cell frame). It is assumed that two congestions of queues #1, #2 are detected in a cycle C1, i.e., 1 is set in FCRR#1, FCRR#2. At the time the congestions are detected, FCCR#1, FCCR#2 of the queues #1, #2 sent from the FCCR generator 36 are 0 as an initial state.

[S11] In the cycle C1, the normal transmission flow control instruction generator 33 compares the levels of FCRR, FCCR with each other. In this case, FCRR#1, FCRR#2 are "H" and FCCR#1, FCCR#2 are "L", indicating the existence of two queues having different levels. According to the present invention, since the flow control information is assigned in the event format, only a flow control instruction of one of the queues is sent. In this case, it is assumed that the normal transmission flow control instruction generator 33 selects the queue #1, and generates a flow control instruction A#1-1 indicative of the occurrence of a congestion of the queue #1. The normal transmission flow control instruction generator 33 also makes the normal transmission priority enable e1 valid.

[S12] When the FCCR generator 36 receives the flow control instruction A#1-1 and recognizes that the received flow control instruction has contents indicative of the stoppage of sending data to the queue #1, the FCCR generator 36 sets the FCCR#1 to "H". Since the FCCR generator 36 does not receive a flow control instruction of the queue #2, FCCR#2 is not changed and remains to be "L".

[S13] In a cycle C2, the normal transmission flow control instruction generator 33 compares the levels of FCRR and FCCR with each other. Both the levels of FCRR#1 and FCCR#1 are "H", the level of FCRR#2 is "H", and the level of FCCR#2 is "L". Since the levels of the queue #2 are different from each other, the normal transmission flow control instruction generator 33 generates a flow control instruction A#2-1 indicative of the occurrence of a congestion of the queue #2. The normal transmission flow control instruction generator 33 keeps the normal transmission priority enable e1 valid.

[S14] When the FCCR generator 36 receives the flow control instruction A#2-1 and recognizes that the received flow control instruction has contents indicative of the stoppage of sending data to the queue #2, the FCCR generator 36 sets the FCCR#2 to "H". Since the FCCR generator 36 does not receive a flow control instruction of the queue #1, FCCR#1 is not changed and remains to be "H".

[S15] In a cycle C3, the normal transmission flow control instruction generator 33 monitors FCRR#1 and recognizes that it is "L" and the congestion is removed. The normal transmission flow control instruction generator 33 compares the levels of FCRR and FCCR with each other. Inasmuch as the level of FCRR#1 is "L" and the level of FCCR#1 is "H", the normal transmission flow control instruction generator 33 generates a flow control instruction A#1-2 meaning sending data to the queue #1. The normal transmission flow control instruction generator 33 keeps the normal transmission priority enable e1 valid.

[S16] When the FCCR generator 36 receives the flow control instruction A#1-2 generated in step S15 and recognizes that the received flow control instruction has contents indicative of sending data to the queue #1, the FCCR generator 36 sets the FCCR#1 to "L". Since the FCCR generator 36 does not receive a flow control instruction of the queue #2, FCCR#2 is not changed and remains to be "H".

[S17] In a cycle C4, the normal transmission flow control instruction generator 33 monitors FCRR#2 and recognizes that it is "L" and the congestion is removed. The normal transmission flow control instruction generator 33 compares the levels of FCRR and FCCR with each other. Inasmuch as the level of FCRR#2 is "L" and the level of FCCR#2 is "H", the normal transmission flow control instruction generator 33 generates a flow control instruction A#2-2 meaning sending data to the queue #2. The normal transmission flow control instruction generator 33 keeps the normal transmission priority enable e1 valid.

[S18] When the FCCR generator 36 receives the flow control instruction A#2-2 generated in step S17 and recognizes that the received flow control instruction has contents indicative of sending data to the queue #2, the FCCR generator 36 sets the FCCR#2 to "L". Since the FCCR generator 36 does not receive a flow control instruction of the queue #1, FCCR#1 is not changed and remains to be "L".

[S19] In a cycle C5, no congestions of FCRR#1, FCRR#2 are occurring. The normal transmission flow control instruction generator 33 compares the levels of FCRR#1, #2 the levels FCCR#1, #2 with each other. Since both the levels are "L" and are of the same value, the normal transmission flow control instruction generator 33 does not generate a flow control instruction with respect to the queues #1, #2, and makes the normal transmission priority enable e1 invalid. Since the FCCR generator 36 does not receive new flow control instructions of FCRR#1, #2, the FCCR generator 36 keeps FCCR#1, #2 unchanged, i.e., they remain to be "L".

Figure 11:
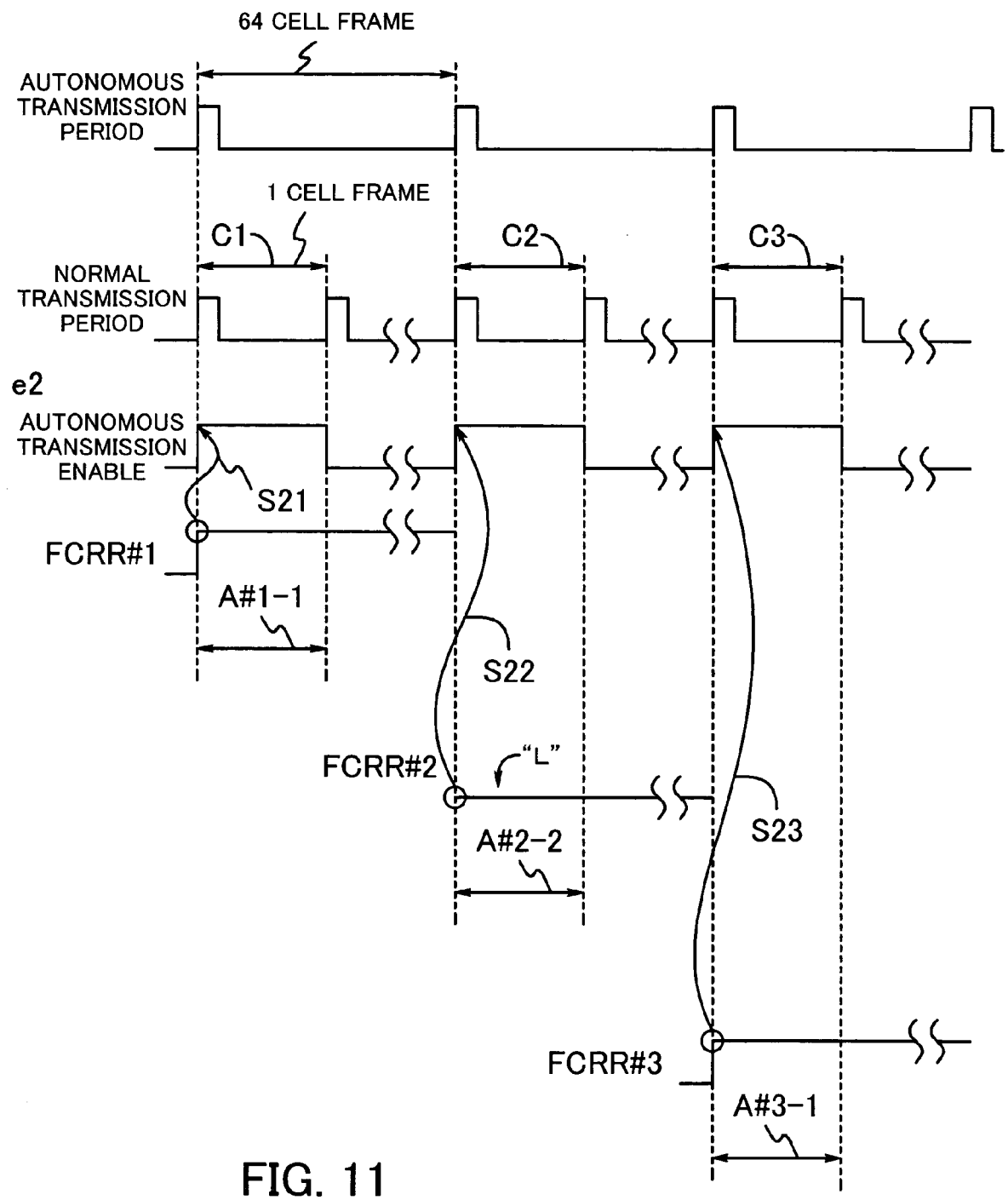
FIG. 11 is a diagram illustrating how a flow control instruction is generated based on FCRR and FCCR.

FIG. 11 is a timing chart of a flow control instruction generating process in the autonomous transmission mode for autonomously sending the queue levels of queues #1 through #3. The autonomous transmission flow control instruction generator 34 monitors FCRR sent from the FCRR generator 32 in each autonomous transmission period (e.g., 64-cell frame time). It is assumed that 1 is set in FCRR#1 in a cycle C1, FCRR#2 is 0 in a cycle C2, and FCRR#3 is 1 in a cycle C3.

[S21] In the cycle C1, the autonomous transmission flow control instruction generator 34 detects FCRR#1. Since FCRR#1 is "H", the autonomous transmission flow control instruction generator 34 generates a flow control instruction A#1-1 indicative of the occurrence of a congestion of the queue #1, and makes the autonomous transmission enable e2 valid.

As described above, since the autonomous transmission enable e2 is validated when the preset period value=64 and the count of the counter agree with each other, and thereafter 1 is loaded into the counter in a next cell frame, the interval in which the autonomous transmission enable e2 is "H" is a one-cell frame interval.

[S22] In the cycle C2, the autonomous transmission flow control instruction generator 34 detects FCRR#2. Since FCRR#2 is "L", the autonomous transmission flow control instruction generator 34 generates a flow control instruction A#2-2 indicative of the removal of the congestion of the queue #2, and also makes the autonomous transmission enable e2 valid.

[S23] In the cycle C3, the autonomous transmission flow control instruction generator 34 detects FCRR#3. Since FCRR#3 is "H", the autonomous transmission flow control instruction generator 34 generates a flow control instruction A#3-1 indicative of the occurrence of a congestion of the queue #3, and also makes the autonomous transmission enable e2 valid.

Figure 12:
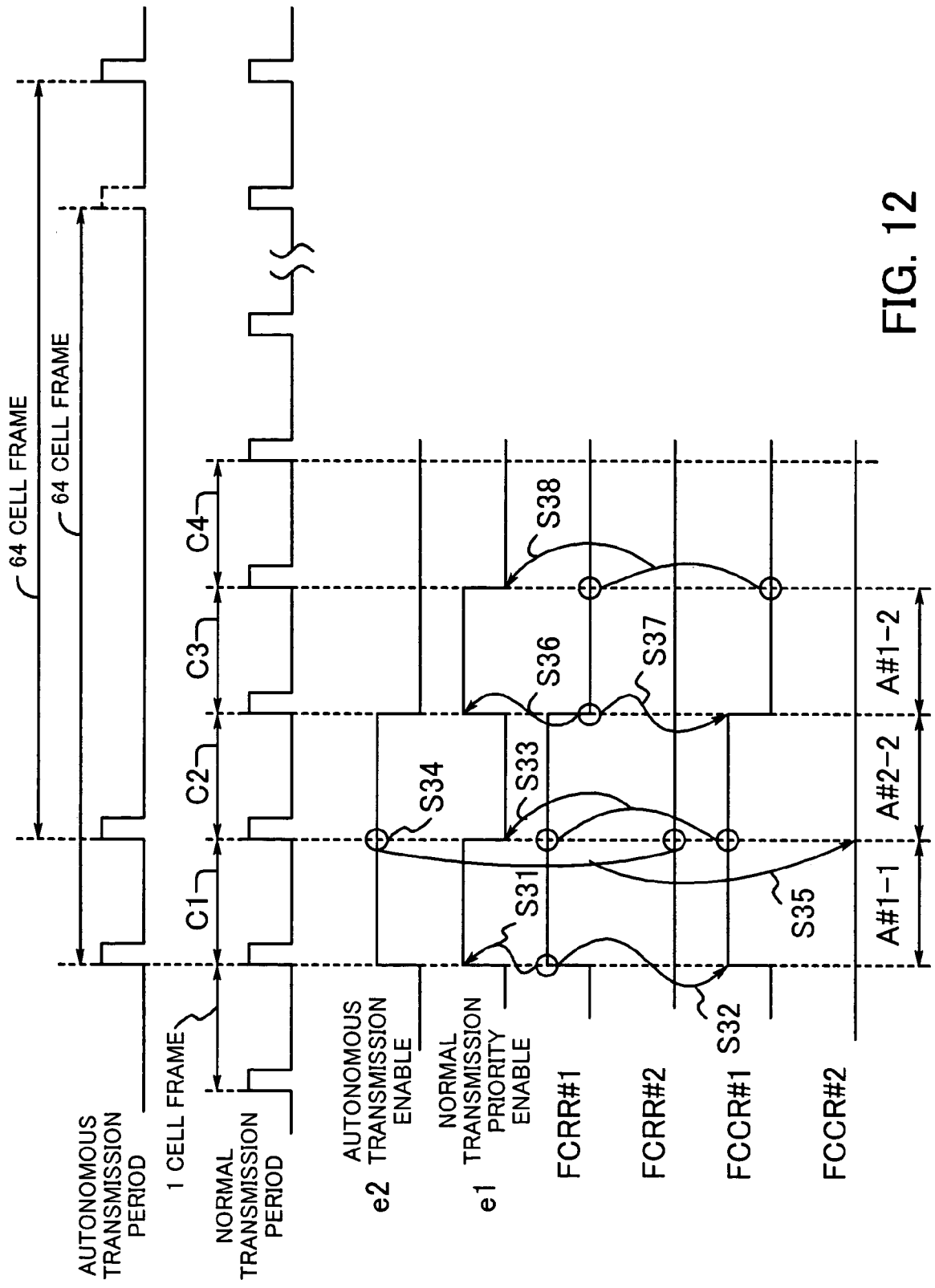
FIG. 12 is a diagram illustrating how a flow control instruction is generated based on FCRR and FCCR.

FIG. 12 is a timing chart of a flow control instruction generating process at the time the timings of the normal transmission mode and the autonomous transmission mode coincide with each other. It is assumed that in the autonomous transmission mode, an event where a congestion of the queue #1 has occurred is detected at the timing to select the queue #2.

[S31] The timings of the normal transmission mode and the autonomous transmission mode coincide with each other in a cycle C1. At this time, priority is given to the normal transmission mode. The normal transmission flow control instruction generator 33 compares the levels of FCRR#1, FCCR#1 with each other. In this case, FCRR#1 is "H" and FCCR#1 is "L". Therefore, the normal transmission flow control instruction generator 33 generates a flow control instruction A#1-1 indicative of the occurrence of a congestion of the queue #1. The normal transmission flow control instruction generator 33 also makes the normal transmission priority enable e1 valid. The normal transmission priority enable e1 is sent to the autonomous transmission flow control instruction generator 34. Because the cycle C1 is the timing of the autonomous transmission mode, the autonomous transmission flow control instruction generator 34 makes the autonomous transmission enable e2 valid, but stops its operation as the normal transmission priority enable e1 is valid.

[S32] When the FCCR generator 36 receives the flow control instruction A#1-1 and recognizes that the received flow control instruction has contents indicative of the stoppage of sending data to the queue #1, the FCCR generator 36 sets the FCCR#1 to "H".

[S33] In a cycle C2, the congestion of FCRR#1 still continues. The normal transmission flow control instruction generator 33 compares the levels of FCRR#1 and FCCR#1 with each other. Since both the levels of FCRR#1 and FCCR#1 are "H" and are of the same value, the normal transmission flow control instruction generator 33 does not generate a flow control instruction with respect to the queue #1, and makes the normal transmission priority enable e1 invalid ("L"). Since the FCCR generator 36 does not receive a new flow control instruction of FCRR#1, the FCCR generator 36 keeps FCCR#1 unchanged, i.e., it remains to be "H".

[S34] In as much as priority has been given to the normal transmission mode in the preceding cycle (cycle C1), the autonomous transmission flow control instruction generator 34 makes the autonomous transmission enable e2 valid in the cycle C2. As the normal transmission priority enable e1 sent from the normal transmission flow control instruction generator 33 is invalid, the autonomous transmission flow control instruction generator 34 performs autonomously sends data to the queue #2. FCRR#2 is "L". Therefore, the autonomous transmission flow control instruction generator 34 generates a flow control instruction A#2-2 meaning sending data to the queue #2.

[S35] When the FCCR generator 36 receives the flow control instruction A#2-2 generated in step S34 and recognizes that the received flow control instruction has contents indicative of sending data to the queue #2, the FCCR generator 36 sets the FCCR#2 to "L" (since FCCR#2 is originally been "L", the level of FCCR#2 itself does not change).

[S36] In a cycle C3, the normal transmission flow control instruction generator 33 monitors FCRR#1. Since FCRR#1 is "L", the normal transmission flow control instruction generator 33 recognizes that the congestion is removed. The normal transmission flow control instruction generator 33 compares the levels of FCRR and FCCR with each other. Because the level of FCRR#1 is "L" and the level of FCCR#1 is "H", the normal transmission flow control instruction generator 33 generates a flow control instruction A#1-2 meaning sending data, and also makes the normal transmission priority enable e1 valid ("H").

[S37] When the FCCR generator 36 receives the flow control instruction A#1-2 generated in step S36 and recognizes that the received flow control instruction has contents indicative of sending data to the queue #1, the FCCR generator 36 sets the FCCR#1 to "L".

[S38] In a cycle C4, no congestion of FCRR#1 is occurring. The normal transmission flow control instruction generator 33 compares the levels of FCRR#1, FCCR#1 with each other. Since both the levels are "L" and are of the same value, the normal transmission flow control instruction generator 33 does not generate a flow control instruction with respect to the queue #1, and makes the normal transmission priority enable e1 invalid ("L"). Since the FCCR generator 36 does not receive a new flow control instruction of FCRR#1, the FCCR generator 36 keeps FCCR#1 unchanged, i.e., it remains to be "L".

Figure 13:
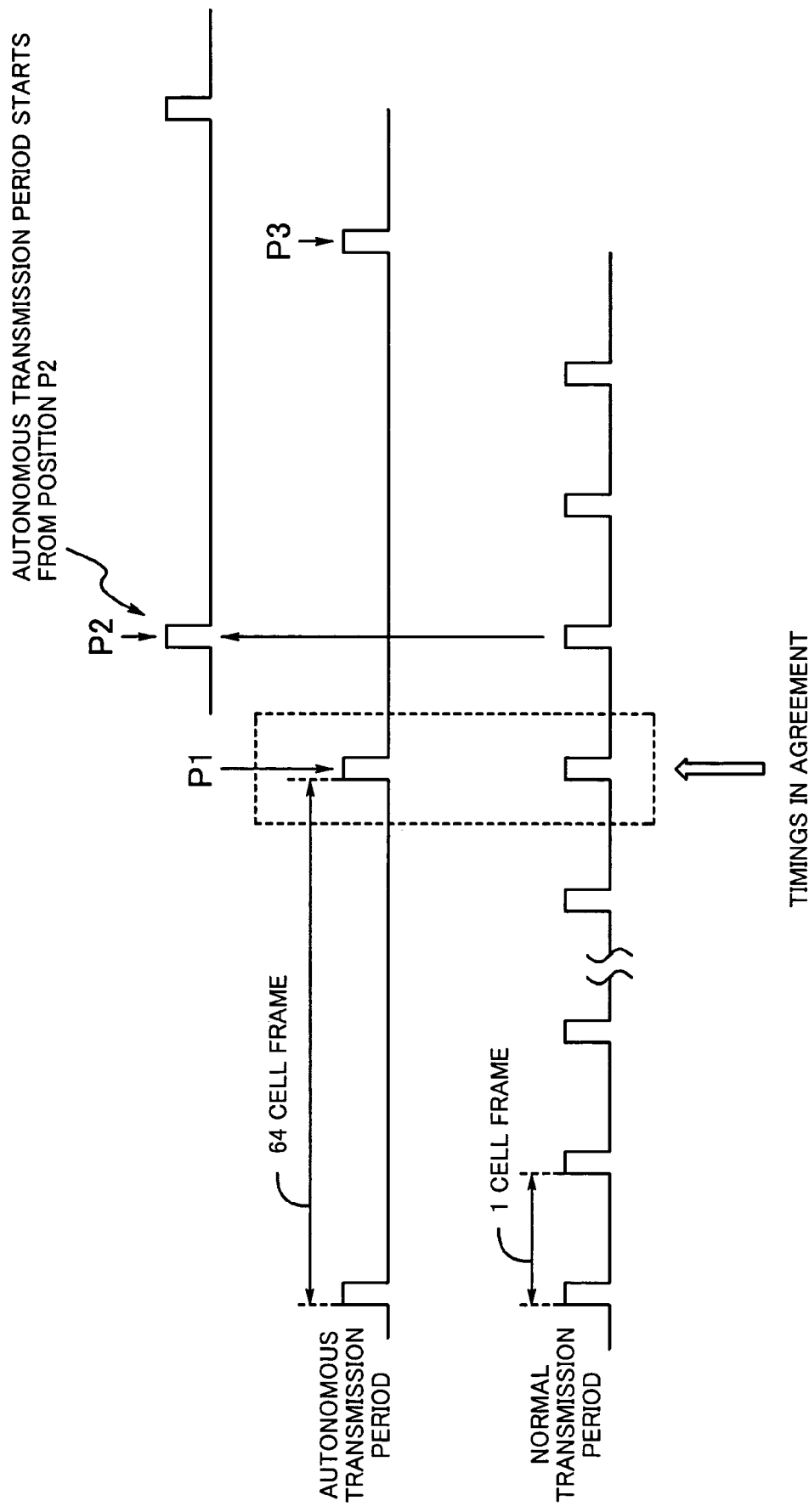
FIG. 13 is a diagram illustrating how an autonomous transmission period is set up when the timings of autonomous transmission and normal transmission modes coincide with each other.

FIG. 13 illustrates how an autonomous transmission period is set up when the timings of the autonomous transmission mode and the normal transmission mode coincide with each other. When the timings of the autonomous transmission mode and the normal transmission mode coincide with each other, the normal transmission mode is performed. When the normal transmission mode is finished and the transmission system returns to the autonomous transmission mode, the autonomous transmission mode has its periods starting after one cell frame next to the normal transmission mode.

In FIG. 13, the timings of the autonomous transmission mode and the normal transmission mode coincide with each other at a position P1. When the normal transmission mode is then performed, the autonomous transmission timing generator 31 shown in FIG. 7 starts counting autonomous transmission periods from a position P2 after one cell frame next to the normal transmission mode. By performing such a control process, it is possible to carry out the autonomous transmission mode from the position P2 of the next cell frame after the normal transmission mode is finished (if the above control process is not performed, the autonomous transmission mode would begin from a position P3, leaving a long blank period from the normal transmission mode to the autonomous transmission mode).

Figure 14:
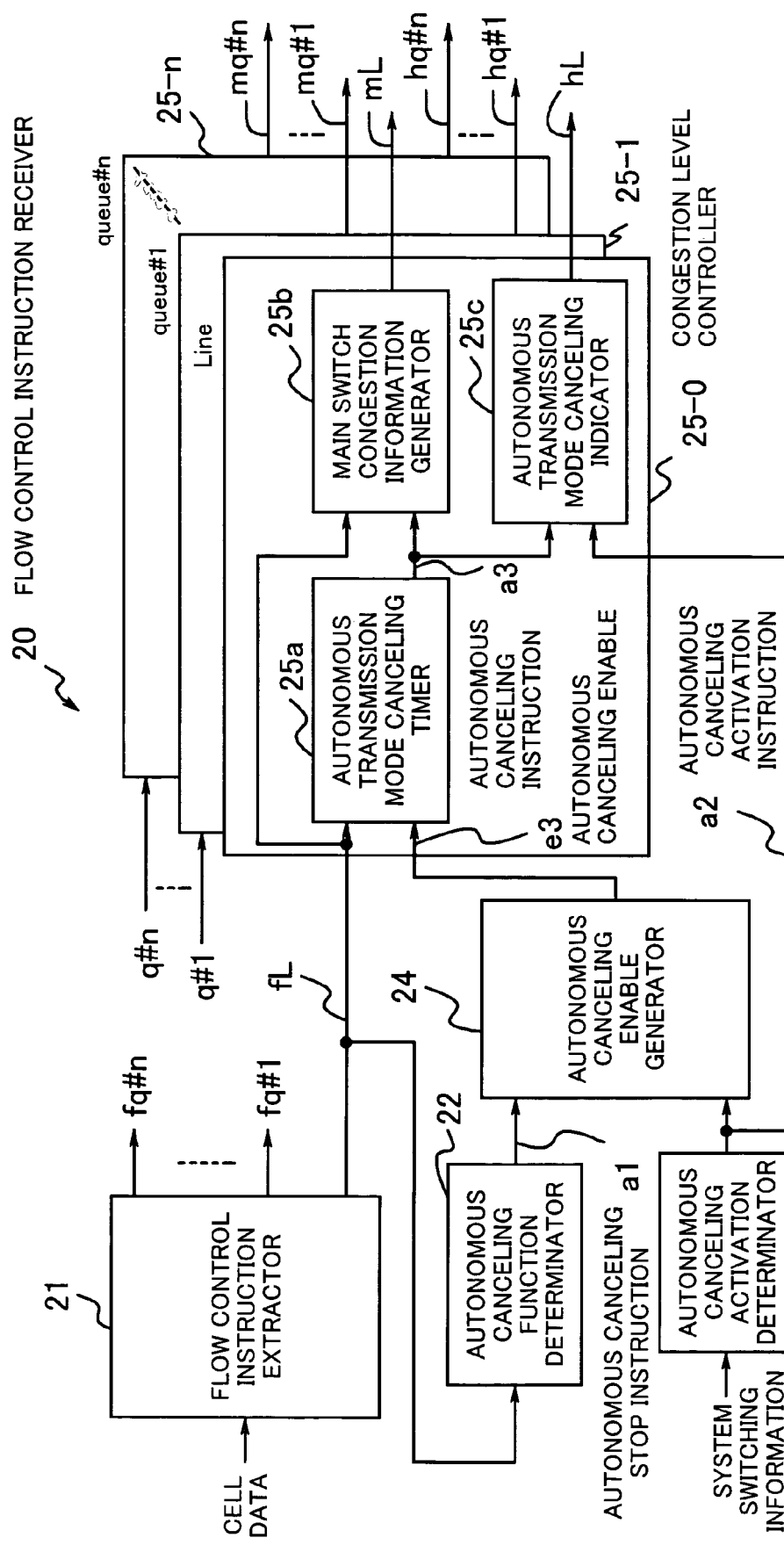
FIG. 14 is a block diagram of an arrangement of a flow control instruction receiver.

An arrangement and operation of the flow control instruction receiver 20 will be described in detail below. FIG. 14 shows in block form an arrangement of the flow control instruction receiver 20. As shown in FIG. 14, the flow control instruction receiver 20 comprises a flow control instruction extractor 21, an autonomous canceling function determinator 22, an autonomous canceling activation determinator 23, an autonomous canceling enable generator 24, and congestion level controllers 25-0 through 25-n.

Each of the congestion level controllers 25-0 through 25-n comprises an autonomous transmission mode canceling timer 25a, a main switch congestion information generator 25b, and an autonomous transmission mode canceling indicator 25c. The congestion level controller 25-0 performs a control process corresponding to the line level, and the congestion level controllers 25-1 through 25-n perform a control process corresponding to the respective queues #1 through #n. Operation of the line-level congestion level controller 25-0 will be described below.

The flow control instruction extractor 21 extracts a flow control instruction from cell data output from the P/C 202 shown in FIG. 2. Specifically, the flow control instruction extractor 21 extracts one of a line-level flow control instruction fL and n queue-level flow control instructions Fq#1 through F1#n. After having extracted a flow control instruction, the flow control instruction extractor 21 clears a flow control instruction assignment area in the cell header.

The autonomous canceling function determinator 22 determines whether the action of an autonomous canceling function (a function to cancel a flow control process of autonomously stopping sending data and start sending cell data if a flow control instruction for sending data is not received upon elapse of a given period of time after a flow control instruction for stopping sending data is received and sending of the cell data is stopped) is to be forcibly stopped or not, based on a certain single flow control instruction, which is the line-level flow control instruction fL in FIG. 14.

If the flow control instruction sender 30 shown in FIG. 7 has the above autonomous transmission function (a function to send a flow control instruction periodically regardless of the occurrence of an event) then the flow control instruction receiver 20 is not required to perform an autonomous canceling process. This is because even if a certain flow control instruction is not properly received due to a fault or the like on the transmission path, the flow control instruction which is not properly received will eventually be resent providing the flow control instruction sender 30 has the autonomous transmission function.

Therefore, if a flow control instruction is sent by the autonomous transmission function, then the flow control instruction receiver 20 is not required to autonomously cancel the flow control process, but the action of the flow control autonomous canceling function is disabled.

If the flow control instruction sender 30 has only the normal transmission function (a function to send a flow control instruction of a congestion state represented by the occurrence of an event), a certain single flow control instruction serves to repetitively send the contents which change from "stopping sending data" to "sending data (canceling the stoppage of sending data)" to "stopping sending data" to "sending data", . . . . For example, the contents change from "a flow control instruction for stopping sending data is sent as the queue #1 is congested" to "the flow control instruction for stopping sending data is executed to remove the congestion of the queue #1, and a flow control instruction for sending data is sent" to "a flow control instruction for stopping sending data is sent as the queue #5 is congested" to "the flow control instruction for stopping sending data is executed to remove the congestion of the queue #5, and a flow control instruction for sending data is sent".

If the flow control instruction sender 30 performs the autonomous transmission mode, then since a flow control instruction is periodically sent, with respect to a certain single queue or line, the flow control instruction serves to repetitively send the contents which change from "stopping sending data" to "stopping sending data" to "stopping sending data" . . . , or "sending data" to "sending data" to "sending data" . . . .

For example, when the congestion state of a line is observed, if the congestion state represents a congestion of the line, a flow control instruction for stopping sending data to the line is periodically sent a number of times until the congestion is removed. If the congestion state represents the removal of the congestion of the line, then a flow control instruction for sending data to the line is periodically sent a number of times.

Consequently, the autonomous canceling function determinator 22 monitors whether a flow control instruction for stopping sending data is received a number of successive times or a flow control instruction for sending data is received a number of successive times with respect to a certain single queue or line. If such a flow control instruction is received a number of successive times, then the autonomous canceling function determinator 22 outputs an autonomous canceling stop instruction a1.

If the number of successive times to be monitored is set to 10 and the line-level flow control instruction fL in the contents of the sent data is counted, then the autonomous canceling function determinator 22 counts up each time line-level flow control instruction fL is received. When the count reaches 10, the autonomous canceling function determinator 22 regards the flow control instruction sender 30 as having the autonomous transmission function, and outputs an autonomous canceling stop instruction a1.

The autonomous canceling activation determinator 23 determines whether the autonomous canceling function is to be forcibly activated or not, i.e., whether the autonomous canceling control process is to be activated or not, if the main switch controller 3 has a duplex structure (a redundant structure made up of a 0 system and a 1 system).

This function is particularly effective in the case where the main switch controller 3 has a duplex structure with one of the systems having an autonomous transmission function and the other having no autonomous transmission function. It is assumed that the 0 system of the main switch controller 3 has both the autonomous transmission function and the normal transmission function and the 1 system does not have the autonomous transmission function, but has the normal transmission function only.

It is also assumed that the 0 system of the main switch controller 3 is communicating with the circuit controller 2. In this state, the 0 system of the main switch controller 3 is in the autonomous transmission mode, and the flow control instruction receiver 20 is not required to autonomously cancel the flow control process, and hence disables the autonomous canceling function by confirming the successive reception of flow control instructions of the same contents. It is assumed that the main switch controller 3 switches from the 0 system to the 1 system.

The autonomous canceling activation determinator 23 knows from system switching information sent from the upper-level system that the main switch controller 3 has switched from the 0 system to the 1 system. The autonomous canceling activation determinator 23 outputs an autonomous canceling activation instruction a2 for activating the autonomous canceling function. Since the 1 system of the main switch controller 3 does not have the autonomous transmission function, but has only the normal transmission function, even if a flow control instruction indicative of the removal of a congestion suffers an error between the circuit controller 2 and the main switch controller 3, the circuit controller 2 is capable of autonomously recovering from a malfunction as the circuit controller 2 has its autonomous canceling function active.

The autonomous canceling activation determinator 23 is not required to know which of the 0 and 1 systems has the autonomous transmission function in the main switch controller 3, but activates the autonomous canceling function when the 0 system switches to the 1 system or the 1 system switches to the 0 system. This is because when the autonomous canceling function is turned on upon system switching, the autonomous canceling function may remain turned on if the switched system does not have the autonomous transmission function, and the autonomous canceling function is turned off by judging the successive reception of flow control instructions of the same contents if the switched system has the autonomous transmission function.

The autonomous canceling enable generator 24 outputs an autonomous canceling enable e3 indicative of whether the autonomous canceling function is to be performed or not based on the autonomous canceling stop instruction a1 and the autonomous canceling activation instruction a2 (when the autonomous canceling function is to be performed, the autonomous canceling enable e3 becomes valid, and when the autonomous canceling function is not to be performed, the autonomous canceling enable e3 becomes invalid).

If the autonomous canceling stop instruction a1 is valid, then the autonomous canceling enable e3 is invalidated in order to disable the autonomous canceling function. If autonomous canceling activation instruction a2 is valid, then autonomous canceling enable e3 is validated in order to activate the autonomous canceling function. Default settings, after hardware resetting are that settings are for the autonomous canceling function and the autonomous canceling enable e3 is valid.

The autonomous transmission mode canceling timer 25a is a timer for autonomously canceling the flow control process to stop sending data and sending data again, and operates only when the autonomous canceling enable e3 is valid. If a line-level flow control instruction fL has contents to stop sending data, the autonomous transmission mode canceling timer 25a starts measuring time, and thereafter clears its count when it receives a line-level flow control instruction fL having contents to send data (in this case, communications between the main switch controller 3 and the circuit controller 2 are performed normally).

If the measured time exceeds a time set by the upper-level system, then autonomous transmission mode canceling timer 25a judges a malfunction (e.g., fails to receive a line-level flow control instruction fL having contents to send data), and outputs an autonomous canceling instruction (data transmission resumption instruction) a3 (clears the count when it outputs the autonomous canceling instruction a3).

The main switch congestion information generator 25b generates main switch congestion information M and sends the main switch congestion information M to the read controller 201c shown in FIG. 2. The main switch congestion information M includes either one of line-level congestion information mL and queue-level congestion information mq#1 through mq#n. The main switch congestion information generator 25b shown in FIG. 14 receives a line-level flow control instruction fL and outputs line-level congestion information mL. If the autonomous canceling instruction a3 is valid, the main switch congestion information generator 25b outputs line-level congestion information mL for sending data even if the received line-level flow control instruction fL does not have contents to send data.

If the flow control instruction receiver 20 activates the autonomous canceling function, then the autonomous transmission mode canceling indicator 25c indicates the activation of the autonomous canceling function (historical information of the autonomous canceling function) to the upper-level system (it indicates the activation of the autonomous canceling function to the upper-level system because the activation of the autonomous canceling function represents the occurrence of some failure). If the autonomous canceling function is activated with respect to a line level, then the autonomous transmission mode canceling indicator 25c outputs a line-level autonomous canceling function indication signal hL, and if the autonomous canceling function is activated with respect to a queue level, then the autonomous transmission mode canceling indicator 25c outputs queue-level autonomous canceling function indication signals hq#1 through hq#n. When the upper-level system recognizes the autonomous canceling function indication signals, these signals are cleared.

Figure 15:
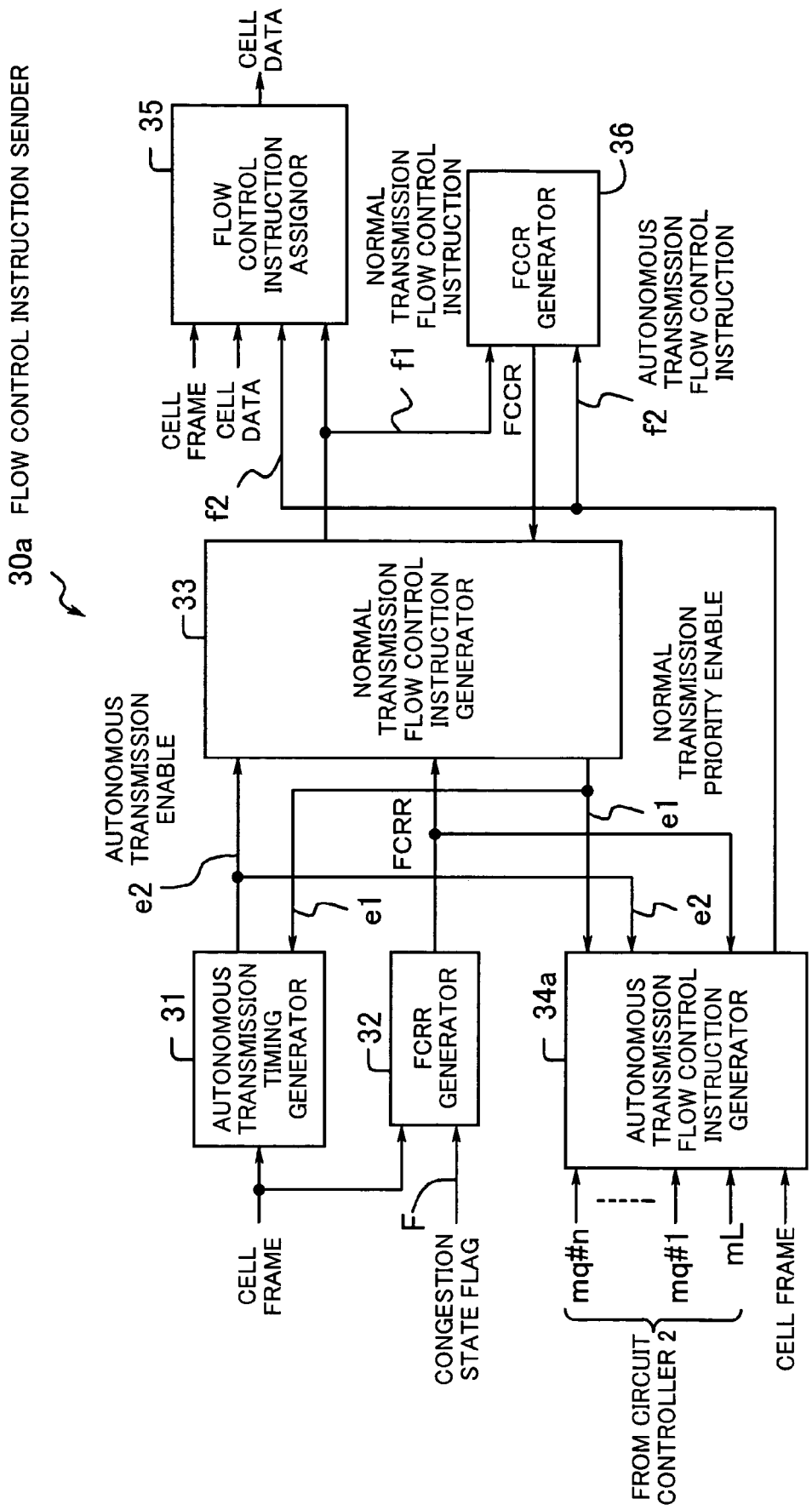
FIG. 15 is a block diagram of an arrangement of a modified flow control instruction sender.

A modification of the flow control instruction sender 30 will be described below. FIG. 15 shows in block form an arrangement of a modified flow control instruction sender 30a. The modified flow control instruction sender 30a differs from the arrangement shown in FIG. 7 in that line-level congestion information mL and queue-level congestion information mq#1 through mq#n are input to an autonomous transmission flow control instruction generator 34a. Other block details are identical to those shown in FIG. 7.

In the autonomous transmission mode of the flow control instruction sender 30 shown in FIG. 7, when an autonomous transmission period arrives, a congestion state of a line level or a queue level is selected, and a flow control instruction is sent. According to the modification of the present invention, those of the contents of a flow control instruction sent from the flow control instruction sender 30a, which are not properly recognized by the flow control instruction receiver 20, are selected and sent.

The autonomous transmission flow control instruction generator 34a receives line-level congestion information mL and queue-level congestion information mq#1 through mq#n sent from the flow control instruction receiver 20. If the autonomous transmission flow control instruction generator 34a is to generate an autonomous transmission flow control instruction, it selects one having a different value.

For example, it is assumed that FCRR#8 causes a congestion, queue-level congestion information mq#8 indicates a congestion removal, and other queue and line contents agree with each other. In this case, since the contents of the queue #8 are different between the flow control instruction sender 30 and the flow control instruction receiver 20, the autonomous transmission flow control instruction generator 34a selects the queue #8 when an autonomous transmission period arrives, and generates a flow control instruction relative to the queue #8 (the line-level congestion information mL and queue-level congestion information mq#1 through mq#n sent from the circuit controller 2 can be the to play the same role as FCCR used in the normal transmission mode). Since only a flow control instruction that is erroneously recognized by the flow control instruction receiver 20 is sent, as described above, the flow control efficiency can further be improved.

When the periods of the autonomous transmission and normal transmission modes coincide with each other, the modified flow control instruction sender 30a shown in FIG. 15 also selects a flow control instruction in the normal transmission mode.

Figure 16:
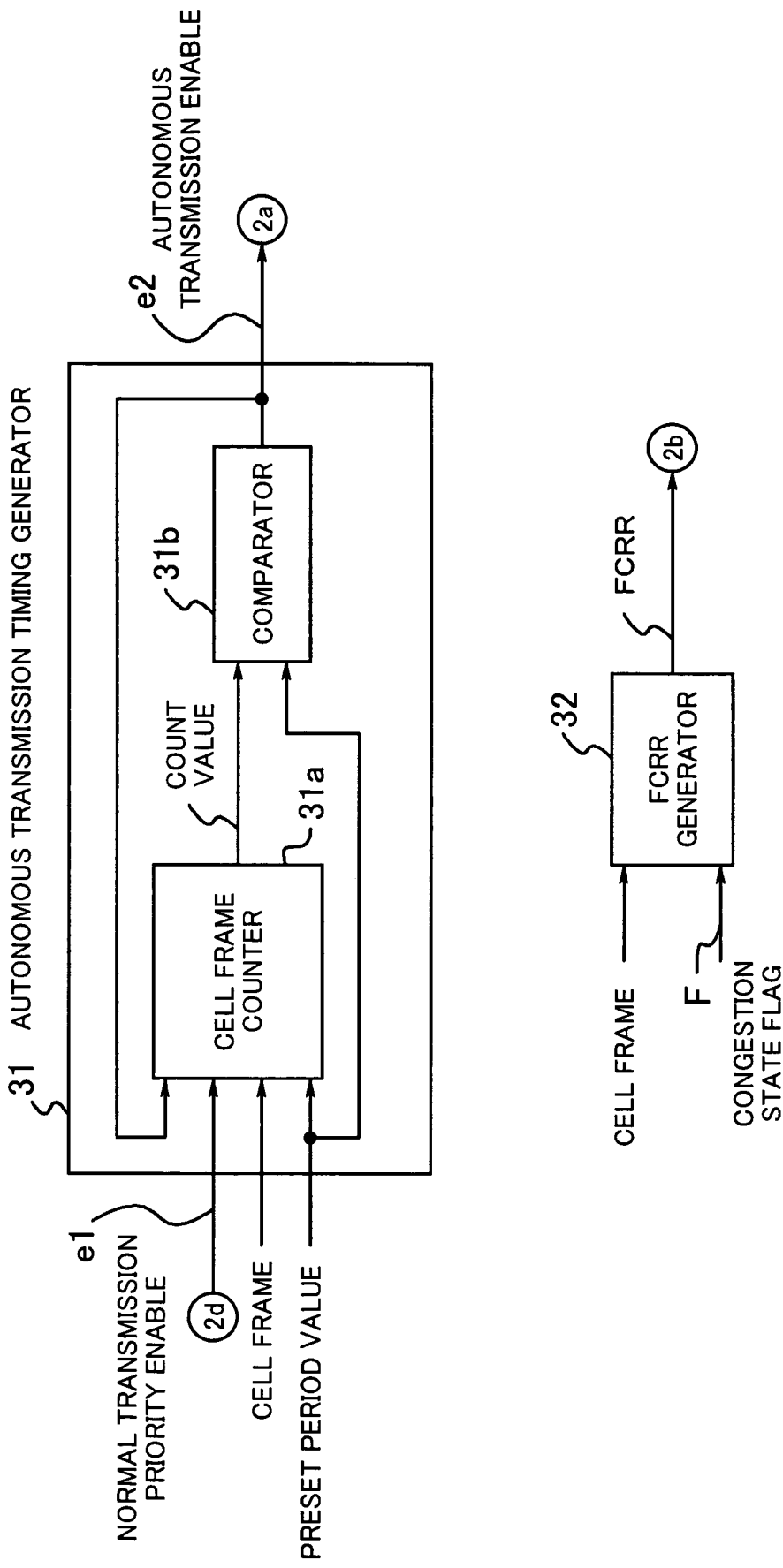
FIG. 16 is a block diagram of an arrangement of the flow control instruction sender.
Figure 17:
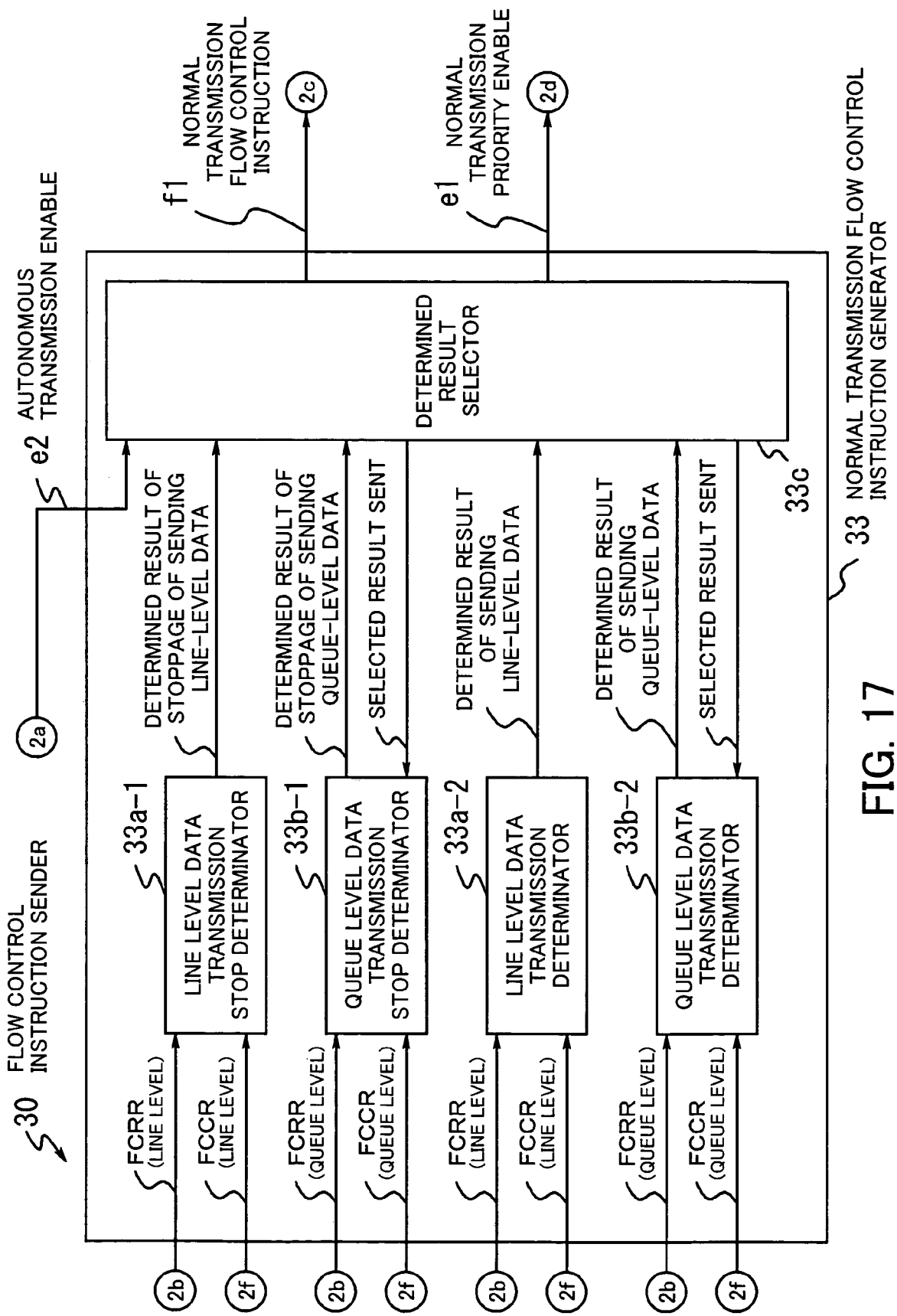
FIG. 17 is a block diagram of an arrangement of the flow control instruction sender.

Details of the flow control instruction sender 30 shown in FIG. 7 will be described below. FIGS. 16 through 19 show in block form an arrangement of the flow control instruction sender 30. As shown in FIG. 16, the autonomous transmission timing generator 31 comprises a cell frame counter 31a and a comparator 31b. As shown in FIG. 17, the normal transmission flow control instruction generator 33 comprises a line level data transmission stop determinator 33a-1, a queue level data transmission stop determinator 33b-1, a line level data transmission determinator 33a-2, a queue level data transmission determinator 33b-2, and a determined result selector 33c.

Figure 18:
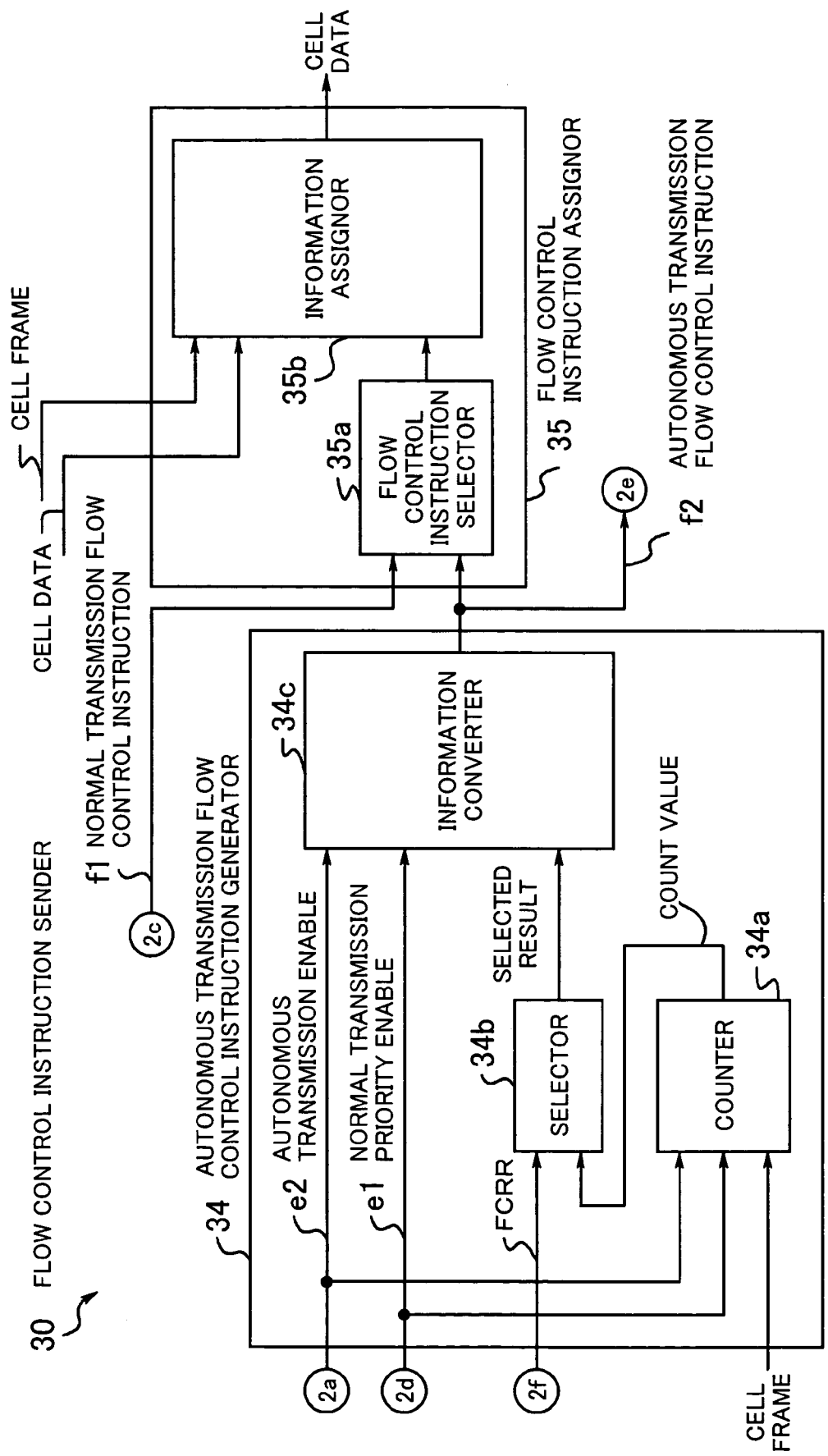
FIG. 18 is a block diagram of an arrangement of the flow control instruction sender.

As shown in FIG. 18, the autonomous transmission flow control instruction generator 34 comprises a counter 34a, a selector 34b, and an information converter 34c. The flow control instruction assignor 35 comprises a flow control instruction selector 35a and an information assignor 35b.

Figure 19:
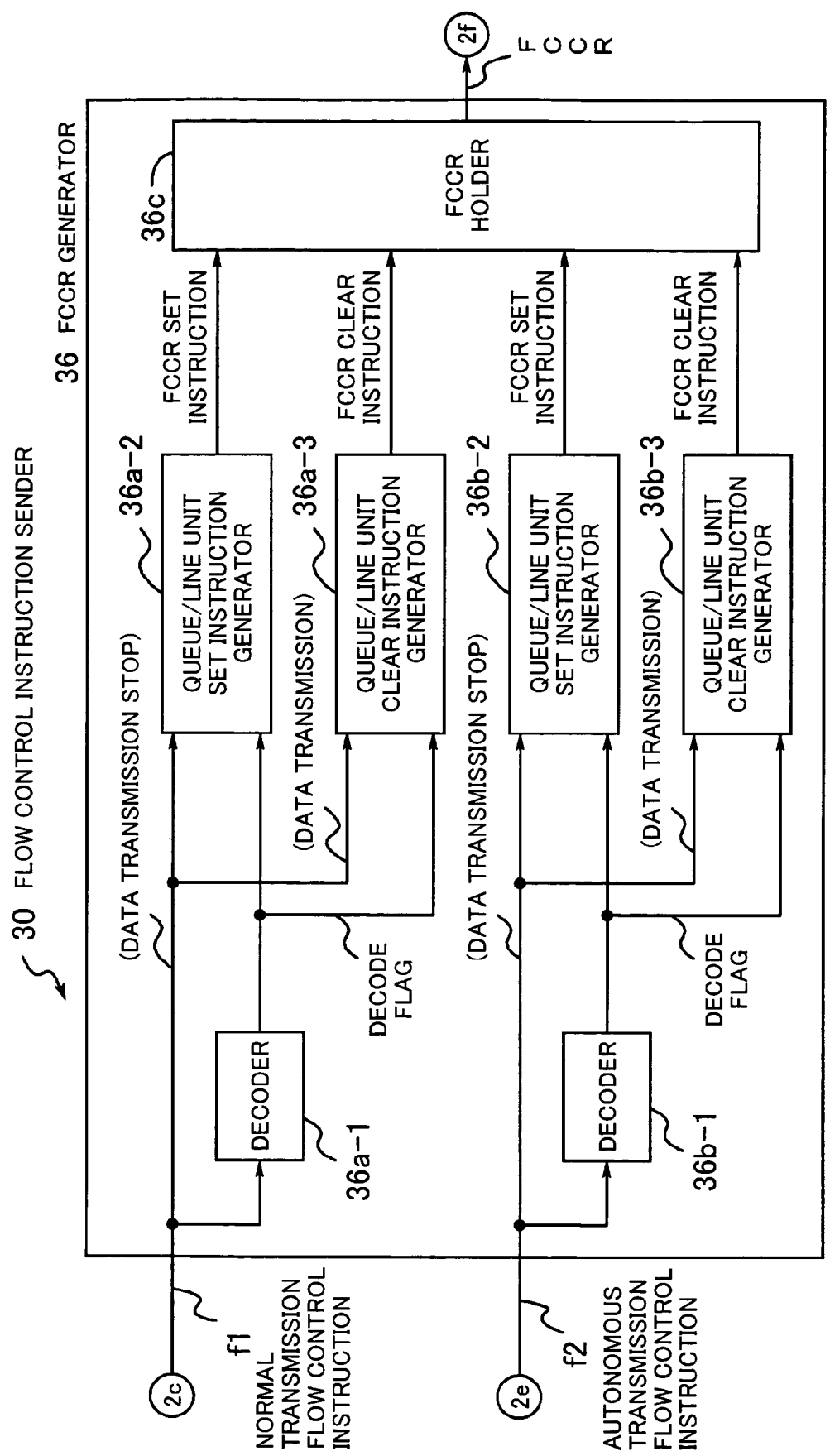
FIG. 19 is a block diagram of an arrangement of the flow control instruction sender.

As shown in FIG. 19, the FCCR generator 36 comprises a decoder 36a-1, a queue/line unit set instruction generator 36a-2, a queue/line unit clear instruction generator 36a-3, a decoder 36b-1, a queue/line unit set instruction generator 36b-2, a queue/line unit clear instruction generator 36b-3, and a FCCR holder 36c.

In the autonomous transmission timing generator 31 shown in FIG. 16, the cell frame counter 31a counts up cell frames by setting a count enable for cell frames. At a cell frame when the autonomous transmission enable e2 is valid and the normal transmission priority enable e1 is invalid, 1 is loaded into the cell frame counter 31a (e.g., since the autonomous transmission enable e2 is valid in the interval of one of 64 cell frames, when the validity of the autonomous transmission enable e2 is confirmed, 1 is loaded into the cell frame counter 31a in order to counter next 64 cell frames). At a cell frame when both the autonomous transmission enable e2 and the normal transmission priority enable e1 are valid, the present period value is loaded into the cell frame counter 31a (if the present period value is loaded into the cell frame counter 31a, it starts counting up cell frames from the next cell frame, so that autonomous transmission periods start being counted immediately after the normal transmission mode (see FIG. 13).

The comparator 31b compares the count and the preset period value (e.g., 64 cell frames) indicated by the upper-level system with each other. If the count $\geq$ the preset period value, then the comparator 31b makes the autonomous transmission enable e2 valid for the interval of one cell frame.

In the normal transmission flow control instruction generator 33, the line level data transmission stop determinator 33a-1 determines the stoppage of sending line-level data. If the line-level bit of FCRR is 1 and the line-level bit of FCCR is 0, the line level data transmission stop determinator 33a-1 makes the determined result of the stoppage of sending line-level data valid.

The queue level data transmission stop determinator 33b-1 determines the stoppage of sending queue-level data. The queue level data transmission stop determinator 33b-1 searches for a queue where the bit of FCRR is 1 and the bit of FCCR is 0 (searching condition α). If there is a queue satisfying the searching condition α, then the queue level data transmission stop determinator 33b-1 makes the determined result of the stoppage of sending queue-level data valid, and sends the determined result together with the queue number (queue information). If there are a plurality of queues satisfying the searching condition α, then the queue level data transmission stop determinator 33b-1 selects one of the queues according to a round robin process, and then sends the determined result of the stoppage of sending queue-level data together with the queue number.

Operation of the queue level data transmission stop determinator 33b-1 according to the round robin process will be described below. First, a search pointer is defined. The search pointer has a default value of 1. If there are n queues, then there are n queue-level FCRRs and n queue-level FCCRs, and numbers ranging from 1 to n are assigned to them.

If the present value of the search pointer is 1, then queues which satisfy the search condition α are searched for successively from 1. The number of the queue which first satisfies the search condition α is sent together with the determined result of the stoppage of sending queue-level data.

The queue number is temporarily stored, and when there is indicated the result of a determined and selected queue level, the value of the search point is updated to the value of "the stored queue number+1" (if the stored queue number is #n, then the value of the search pointer is set to 1). If there is not indicated the result of a determined and selected queue level even when the determined result of the stoppage of sending queue-level data is indicated as being valid, then the value of the search pointer is not updated. In this manner, a queue is selected.

The line level data transmission determinator 33a-2 determines sending line-level data. If the line-level bit of FCRR is 0 and the line-level bit of FCCR is 1, the line level data transmission determinator 33a-2 makes the determined result of sending line-level data valid.

The queue level data transmission determinator 33b-2 determines sending queue-level data. The queue level data transmission determinator 33b-2 searches for a queue where the bit of FCRR is 0 and the bit of FCCR is 1 (searching condition β). If there is a queue satisfying the searching condition β, then the queue level data transmission determinator 33b-2 makes the determined result of sending queue-level data valid, and sends the determined result together with the queue number. If there are a plurality of queues satisfying the searching condition β, then the queue level data transmission determinator 33b-2 selects one of the queues according to a round robin process as described above, and then sends the determined result of sending queue-level data together with the queue number.

In the above description, when the levels of FCRR and FCCR are not in conformity with each other and there are a plurality of queues whose congestion states have changed, a queue is selected according to the round robin process. If there is a state disagreement among queues and there is also a state disagreement with respect to a line, then a queue is selected according to the following order of priority:

[higher priority] line-level flow control instruction (stoppage of sending data) to queue-level flow control instruction (stoppage of sending data) to line-level flow control instruction (sending data) to queue-level flow control instruction (sending data) [lower priority]

If the determined result of the stoppage of sending line-level data sent from the line level data transmission stop determinator 33a-1 is valid, then the determined result selector 33c generates the normal transmission flow control instruction f1 as a flow control instruction having contents to stop sending line-level data.

If the determined result of the stoppage of sending line-level data is invalid and the determined result of the stoppage of sending queue-level data sent from the queue level data transmission stop determinator 33b-1 is valid, then the determined result selector 33c generates the normal transmission flow control instruction f1 as a flow control instruction having contents to stop sending queue-level data corresponding to the queue number sent together with the determined result of the stoppage of sending queue-level data.

If both the determined result of the stoppage of sending line-level data and the determined result of the stoppage of sending queue-level data are invalid and the determined result of sending line-level data sent from the line level data transmission determinator 33a-2 is valid, then the determined result selector 33c generates the normal transmission flow control instruction f1 as a flow control instruction having contents to send line-level data.

If the determined result of the stoppage of sending line-level data, the determined result of the stoppage of sending queue-level data, and the determined result of sending line-level data are invalid and the determined result of sending queue-level data sent from the queue level data transmission determinator 33b-2 is valid, then the determined result selector 33c generates the normal transmission flow control instruction f1 as a flow control instruction having contents to send queue-level data corresponding to the queue number sent together with the determined result of sending queue-level data. The determined result selector 33c sends the determined and selected result of sending queue-level data.

If either one of the determined result of the stoppage of sending line-level data, the determined result of the stoppage of sending queue-level data, the determined result of sending line-level data, and the determined result of sending queue-level data is valid, and the autonomous transmission enable e2 sent from the comparator 31b shown in FIG. 16 is valid, then the determined result selector 33c outputs the normal transmission priority enable e1.

In the autonomous transmission flow control instruction generator 34 shown in FIG. 18, the counter 34a is a counter for selecting which queue to be sent in the autonomous transmission mode. If there are n queues, then there is FCRR having (n+1) bits including a line level. The counter 34a counts up cell frames at the timing of a cell frame when the autonomous transmission enable e2 is valid and the normal transmission priority enable e1 is invalid. The counter 34a counts up cell frames repetitively from 0 to n.

The selector 34b selects the value of a bit indicated by the count from the counter 34a from FCCR having (n+1) bits. The selector 34b sends the selected bit value of FCCR and its queue number as a selected result.

The information converter 34c converts the selected result sent from the selector 34b into an autonomous transmission flow control instruction f2. If the selected bit value of FCCR is 0, then the autonomous transmission flow control instruction f2 is produced as a flow control instruction having contents to send data, and is sent together with the selected queue number. If the selected bit value of FCCR is 1, then the autonomous transmission flow control instruction f2 is produced as a flow control instruction to stop sending data, and is sent together with the selected queue number. The information converter 34c operates only when the autonomous transmission enable e2 is valid and the normal transmission priority enable e1 is invalid.

In the flow control instruction assignor 35 shown in FIG. 18, the flow control instruction selector 35a selects either the normal transmission flow control instruction f1 or the autonomous transmission flow control instruction f2. The normal transmission flow control instruction f1 and the autonomous transmission flow control instruction f2 cannot be valid simultaneously within the same cell time. Therefore, the flow control instruction selector 35a may select a valid flow control instruction (if both the normal transmission flow control instruction f1 and the autonomous transmission flow control instruction f2 are invalid, then the flow control instruction selector 35a may select either one of them).

The information assignor 35b acquires the flow control instruction sent from the flow control instruction selector 35a at a cell frame, and assigns the flow control instruction to the cell header of the cell data.

In the FCCR generator 36 shown in FIG. 19, the decoders 36a-1, 36b-1 decode the queue numbers and lines of the normal transmission flow control instruction f1 and the autonomous transmission flow control instruction f2, and generate (n+1) decode flags.

If the normal transmission flow control instruction f1 has contents to stop sending data, then the queue/line unit set instruction generator 36a-2 uses the decode flag sent from the decoder 36a-1 as an FCCR set instruction according to the normal transmission flow control process.

If the normal transmission flow control instruction f1 has contents to send data, then the queue/line unit clear instruction generator 36a-3 uses the decode flag as an FCCR clear instruction according to the normal transmission flow control process.

If the autonomous transmission flow control instruction f2 has contents to stop sending data, then the queue/line unit set instruction generator 36b-2 uses the decode flag sent from the decoder 36b-1 as an FCCR set instruction according to the autonomous transmission flow control process.

If the autonomous transmission flow control instruction f2 has contents to send data, then the queue/line unit clear instruction generator 36b-3 uses the decode flag as an FCCR clear instruction according to the autonomous transmission flow control process.

The FCCR holder 36c generates and holds (n+1) FCCRs. If an FCCR set instruction according to the normal transmission flow control process is sent for each queue or line, or if an FCCR set instruction according to the autonomous transmission flow control process is sent for each queue or line, then the FCCR holder 36c sets FCCR of the corresponding queue or line.

If an FCCR clear instruction according to the normal transmission flow control process is sent, or if an FCCR clear instruction according to the autonomous transmission flow control process is sent, the FCCR holder 36c clears FCCR of the corresponding queue or line (FCCR is used in the process of generating a normal transmission flow control instruction, and for generating information of FCCR itself, the preceding congestion state is recorded using both the normal transmission flow control instruction f1 and the autonomous transmission flow control instruction f2).

Figure 20:
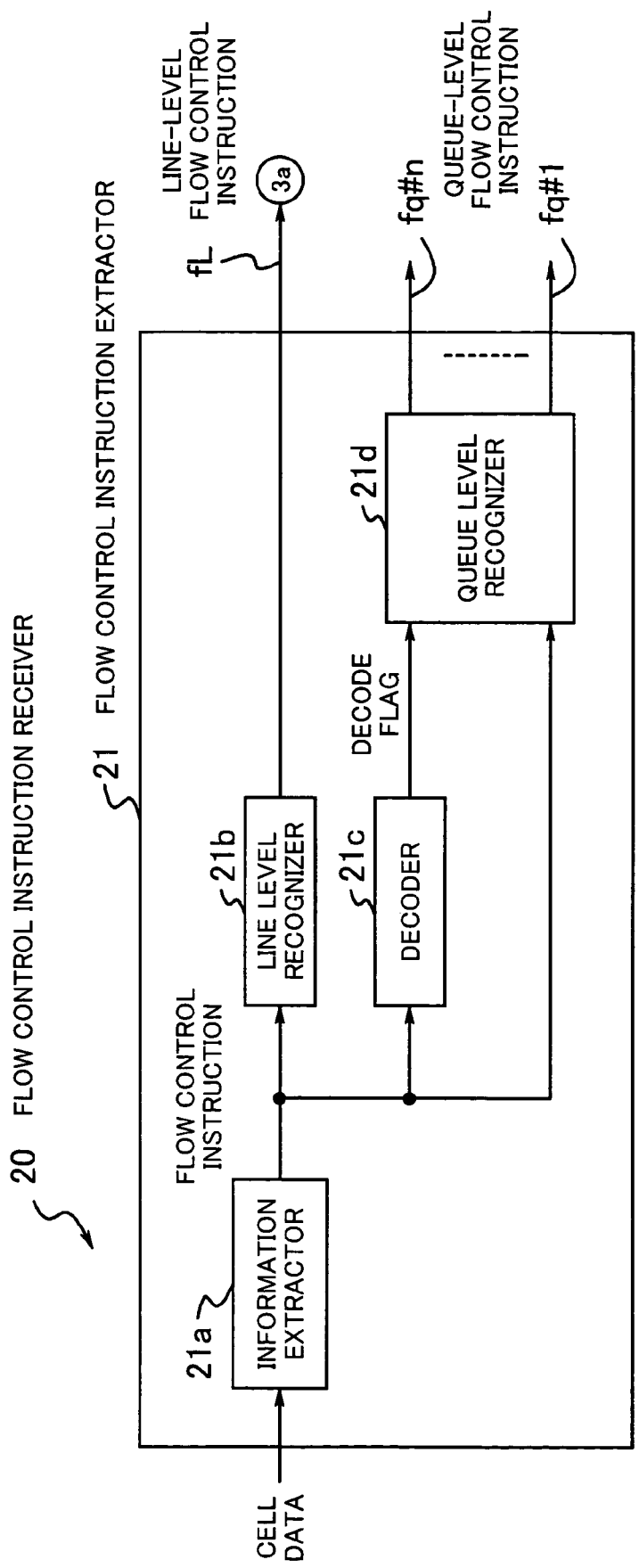
FIG. 20 is a block diagram of an arrangement of the flow control instruction receiver.
Figure 21:
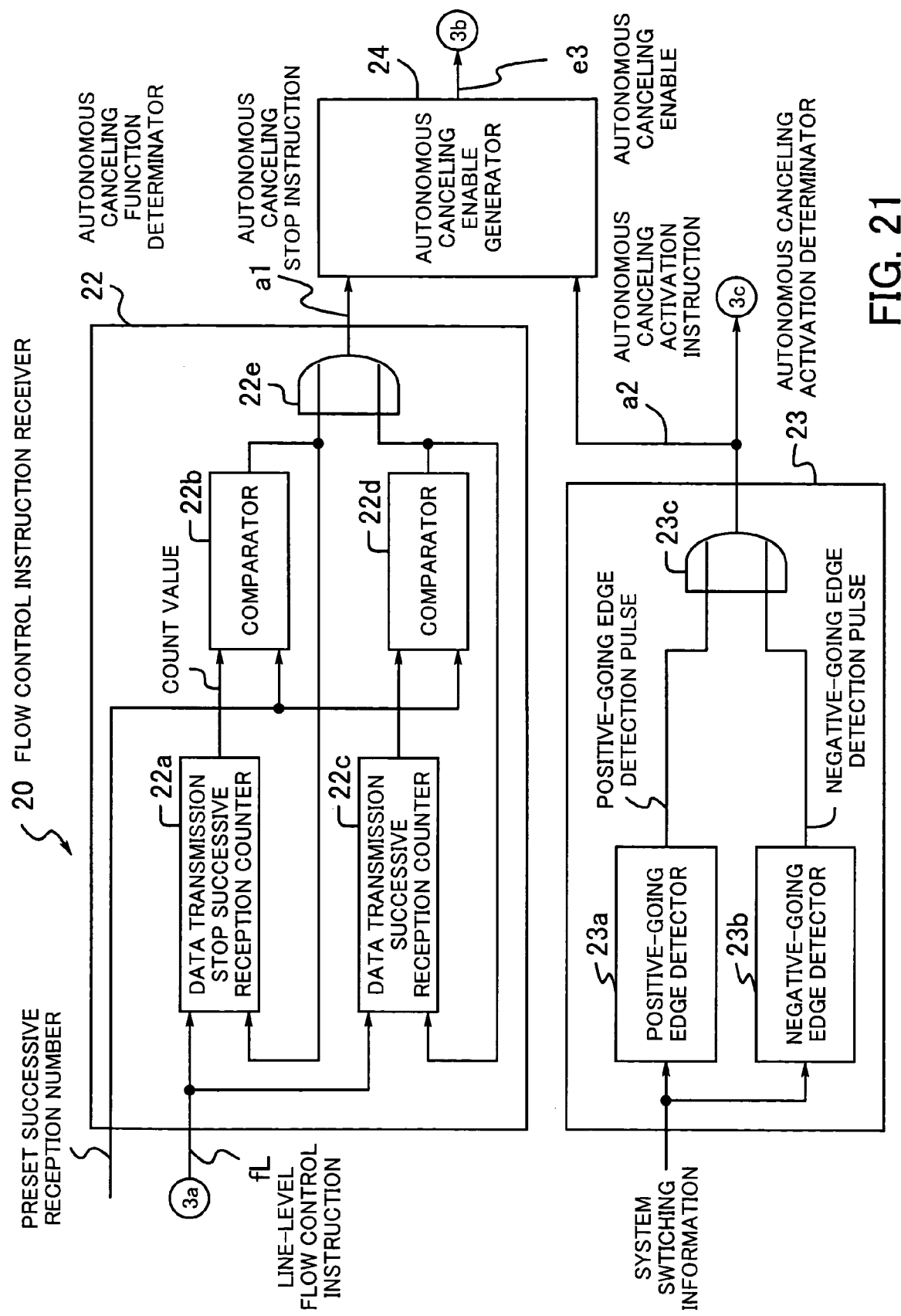
FIG. 21 is a block diagram of an arrangement of the flow control instruction receiver.
Figure 22:
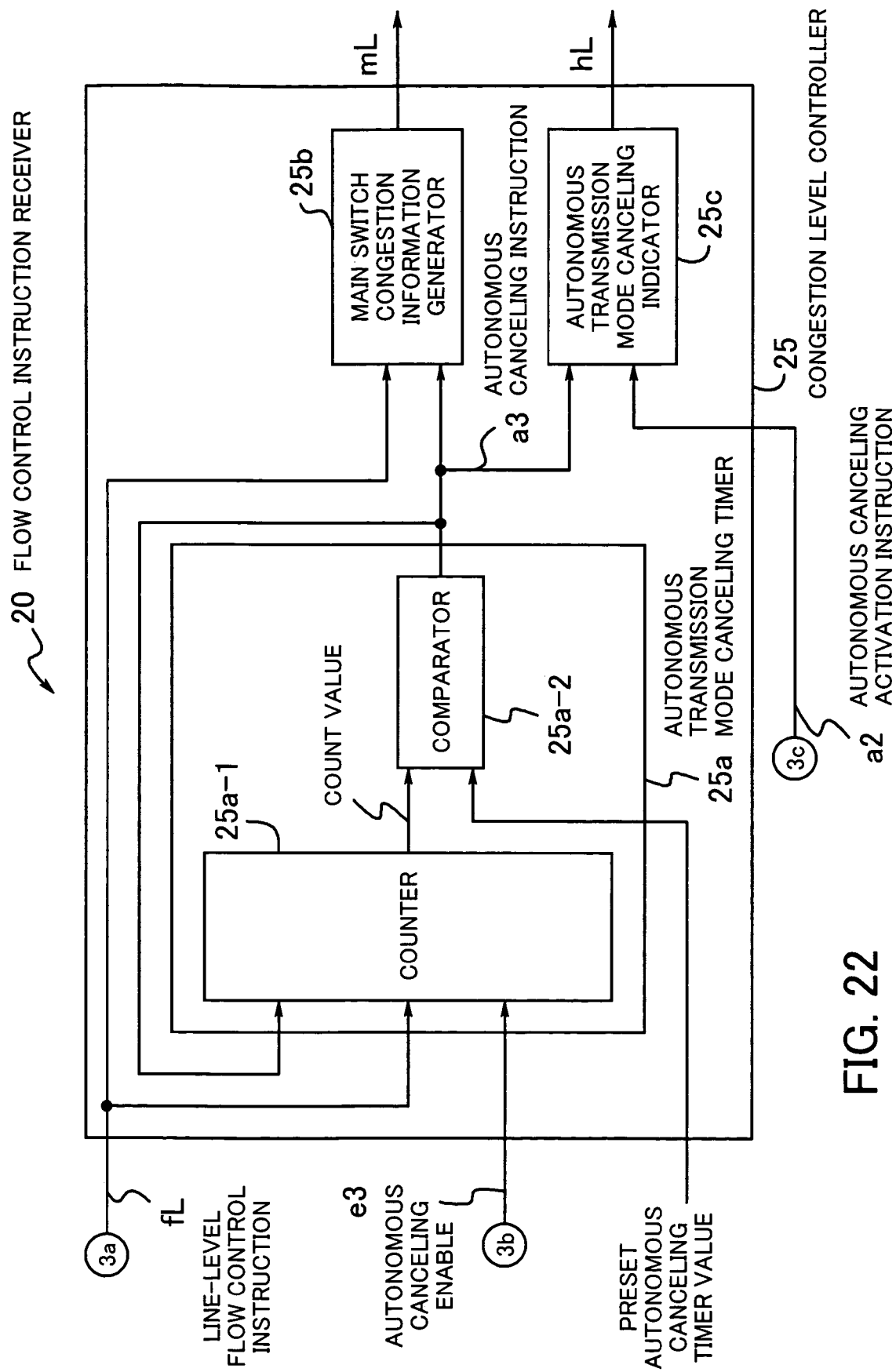
FIG. 22 is a block diagram of an arrangement of the flow control instruction receiver.

Details of the flow control instruction receiver 20 shown in FIG. 14 will be described below. FIGS. 20 through 22 show in block form an arrangement of the flow control instruction receiver 20. As shown in FIG. 20, the flow control instruction extractor 21 comprises an information extractor 21a, a line level recognizer 21b, a decoder 21c, and a queue level recognizer 21d. As shown in FIG. 21, the autonomous canceling function determinator 22 comprises a data transmission stop successive reception counter 22a, a comparator 22b, a data transmission successive reception counter 22c, a comparator 22d, and an OR element 22e.

As shown in FIG. 21, the autonomous canceling activation determinator 23 comprises a positive-going edge detector 23a, a negative-going edge detector 23b, and an OR element 23c. As shown in FIG. 22, the autonomous transmission mode canceling timer 25a in the congestion level controller 25 comprises a counter 25a-1 and a comparator 25a-2.

In the flow control instruction extractor 21 shown in FIG. 20, the information extractor 21a receives cell data output from the P/C 202 shown in FIG. 2, and extracts a flow control instruction assigned to the cell header. After having extracted a flow control instruction, the information extractor 21a clears a flow control instruction area in the cell header.

The line level recognizer 21b determines whether the flow control instruction sent from the information extractor 21a is a line-level flow control instruction or not. If it is a line-level flow control instruction, then the line level recognizer 21b generates a line-level flow control instruction fL. If the flow control instruction sent from the information extractor 21a is a queue-level flow control instruction, then the decoder 21c decodes the queue number and generates a decode flag.

The queue level recognizer 21d recognizes that the flow control instruction sent from the information extractor 21a is a queue-level flow control instruction, and refers to n decode flags sent from the decoder 21c. The queue level recognizer 21d then generates n queue-level flow control instructions fq#1 through fq#n.

In the autonomous canceling function determinator 22 shown in FIG. 21, the data transmission stop successive reception counter 22a counts up line-level flow control instructions fL if they have contents to stop sending data. If a line-level flow control instruction fL has contents to send data, then 0 is loaded into the data transmission stop successive reception counter 22a.

The comparator 22b compares the count sent from the data transmission stop successive reception counter 22a with a preset successive reception number sent from the upper-level system. If the count $\geq$ the preset successive reception number, then the comparator 22b sends a stop instruction based on the data transmission stop successive reception.

The data transmission successive reception counter 22c counts up line-level flow control instructions fL if they have contents to send data. If a line-level flow control instruction fL has contents to stop sending data, then 0 is loaded into the data transmission successive reception counter 22c. When a stop instruction is sent from the comparator 22d, 0 is also loaded into the data transmission successive reception counter 22c.

The comparator 22d compares the count sent from the data transmission successive reception counter 22c with the preset successive reception number sent from the upper-level system. If the count $\geq$ the preset successive reception number, then the comparator 22d sends a stop instruction based on the data transmission successive reception.

The OR element 22e ORs the stop instruction based on the data transmission stop successive reception which is sent from the comparator 22b and the stop instruction based on the data transmission successive reception sent from the comparator 22d, and produces an autonomous canceling stop instruction a1.

In the autonomous canceling activation determinator 23 shown in FIG. 21, the positive-going edge detector 23a detects a positive-going edge of the system switching information, and the negative-going edge detector 23b detects a negative-going edge of the system switching information. The OR element 23c ORs a positive-going edge detection pulse and a negative-going edge detection pulse, and produces an autonomous canceling activation instruction a2.

The autonomous canceling enable generator 24 comprises a flip-flop and generates an autonomous canceling enable e3. Based on the autonomous canceling activation instruction a2 sent from the OR element 23c, the autonomous canceling enable generator 24 sets the autonomous canceling enable e3. Based on autonomous canceling stop instruction a1 sent from the OR element 22e, the autonomous canceling enable generator 24 clears the autonomous canceling enable e3. The autonomous canceling enable e3 is initially in a set state.

In the autonomous transmission mode canceling timer 25a shown in FIG. 22, the counter 25a-1 is a counter operating as a timer for canceling the autonomous transmission mode. The counter operates only when the autonomous canceling enable e3 is valid. The count of the counter is 0 when the autonomous canceling enable e3 is invalid.

When the autonomous canceling enable e3 is valid and the line-level flow control instruction fL has contents to stop sending data, the counter operates as a timer to start measuring elapsed time. When the line-level flow control instruction fL has contents to send data, 0 is loaded into the counter, stopping counting elapsed time. When an autonomous canceling instruction is sent from the comparator 25a-2, 0 is also loaded into the counter, stopping counting elapsed time.

The comparator 25a-2 compares the count sent from the counter 25a-1 with a preset autonomous canceling timer value sent from the upper-level system. If the count $\geq$ the preset autonomous canceling timer value, then the comparator 25a-2 sends an autonomous canceling instruction a3.

The main switch congestion information generator 25b is a flip-flop and generates line-level congestion information mL. If the line-level flow control instruction fL represents the stoppage of sending data, then the main switch congestion information generator 25b sets the line-level congestion information mL. If the line-level flow control instruction fL represents sending data, or if an autonomous canceling instruction a3 is sent from the comparator 25a-2, then the main switch congestion information generator 25b clears the line-level congestion information mL.

The autonomous transmission mode canceling indicator 25c is a flip-flip and generates a line-level autonomous canceling function indication signal hL indicative of an autonomous transmission mode cancellation. If an autonomous canceling instruction a3 is sent from the comparator 25a-2, then the autonomous transmission mode canceling indicator 25c sets the line-level autonomous canceling function indication signal hL. If this flag is read by the upper-level system or the autonomous canceling activation instruction a2 is sent, then the autonomous transmission mode canceling indicator 25c clears the line-level autonomous canceling function indication signal hL.

According to the present invention, as described above, even when the transmission system cannot recognize a flow control instruction due to a fault or the like on the transmission path between the flow control instruction sender 30 and the flow control instruction receiver 20 or erroneously recognizes a flow control instruction and malfunctions in the flow control process of the event format, the transmission system can recover to normal operation based on an autonomous hardware action, and hence can provide a highly efficient flow control architecture.

In the transmission system according to the present invention, if an event occurs, the flow control instruction sender sends a flow control instruction for performing flow control over the corresponding congestion state, or selects one of a plurality of present congestion states in each period and autonomously sends a flow control instruction corresponding to the selected congestion state. When the timings of the autonomous transmission and normal transmission modes coincide with each other, the transmission system preferentially sends a flow control instruction in the normal transmission mode. The flow control instruction receiver receives a flow control instruction for flow control. Even if flow control information is invalidated, the flow control can be performed, and even when the transmission system malfunctions, it can autonomously recover to normal operation for communications. Therefore, the transmission system can provide improved communication quality and reliability.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission system for transmitting signals under flow control, comprising:
a flow control instruction sender transmission apparatus having a data receiver for receiving data and a flow control instruction sender having at least one of two functions including a normal transmission mode to send a flow control instruction for flow control over a congestion state if an event, such as the occurrence of a congestion or the removal of a congestion, occurs when the data receiver receives data, and an autonomous transmission mode to select one of a plurality of congestion states at present in each period and autonomously send a flow control instruction corresponding to the selected congestion state, the flow control instruction sender being arranged to preferentially send a flow control instruction in the normal transmission mode in which a congestion actually occurs or is actually removed, when timings of the normal transmission mode and the autonomous transmission mode coincide with each other; and
a flow control instruction receiver transmission apparatus having a data sender for sending data and a flow control instruction receiver for receiving a flow control instruction to perform flow control by stopping sending data and sending data, wherein
the normal transmission mode and the autonomous transmission mode work independently, and
when the timings of the normal transmission mode and the autonomous transmission mode coincide each other, the flow control instruction sender preferentially sends a flow control instruction for the congestion state in the normal transmission mode.

2. The transmission system according to claim 1, wherein the flow control instruction sender sends a flow control instruction corresponding to either one of a queue-level congestion state with respect to a single queue or a line-level congestion state with respect to all queues.

3. The transmission system according to claim 1, wherein the flow control instruction receiver activates a timer if the flow control instruction has contents to stop sending data, and autonomously cancels the stoppage of sending data if a flow control instruction indicative of a cancellation of the stoppage of sending data is not received after elapsed of a given time measured by the timer.

4. The transmission system according to claim 3, wherein if the flow control instruction receiver autonomously cancels the stoppage of sending data, the flow control instruction receiver sends a signal indicative of the autonomous cancellation of the stoppage of sending data to an upper-level system.

5. The transmission system according to claim 3, wherein if the flow control instruction receiver receives a flow control instruction corresponding to a congestion state of the same contents successively a predetermined number of times, the flow control instruction receiver stops the autonomous cancellation of the stoppage of sending data.

6. The transmission system according to claim 3, wherein if the flow control instruction sender transmission apparatus is of a duplex structure having two systems, the flow control instruction receiver activates the autonomous cancellation of the stoppage of sending data upon switching between the two systems.

7. The transmission system according to claim 1, wherein the flow control instruction receiver sends contents of a flow control instruction recognized thereby to the flow control instruction sender, the flow control instruction sender autonomously sends a flow control instruction relative to a congestion state different from the sent contents of the flow control instruction, and when the timings of the normal transmission mode and the autonomous transmission mode coincide with each other, the flow control instruction sender preferentially sends a flow control instruction in the normal transmission mode.

8. A transmission apparatus for transmitting signals under flow control, comprising:
a data receiver for receiving data; and
a flow control instruction sender having at least one of two functions including a normal transmission mode to send a flow control instruction for flow control over a congestion state if an event, such as the occurrence of a congestion or the removal of a congestion, occurs when the data receiver receives data, and an autonomous transmission mode to select one of a plurality of congestion states at present in each period and autonomously send a flow control instruction corresponding to the selected congestion state, the flow control instruction sender being arranged to preferentially send a flow control instruction in the normal transmission mode in which a congestion actually occurs or is actually removed, when timings of the normal transmission mode and the autonomous transmission mode coincide with each other, wherein the normal transmission mode and the autonomous transmission mode work independently, and when the timings of the normal transmission mode and the autonomous transmission mode coincide each other, the flow control instruction sender preferentially sends a flow control instruction for the congestion state in the normal transmission mode.

9. A transmission system for transmitting signals under flow control, comprising:

a main switch controller having a cell receiver for receiving fixed-length cells sent from respective circuits, multiplexing the cells, and buffering the multiplexed cells in a common buffer, a cell reader for reading the multiplexed cells from the common buffer and switching the cells, a buffer monitor for monitoring a congestion state from a buffered state of the cells and generating a congestion state flag, a demultiplexer for demultiplexing the multiplexed cells for the respective circuits, a flow control instruction sender for generating a flow control instruction based on the congestion state flag and assigning the flow control instruction to cells, the flow control instruction sender having at least one of two functions including a normal transmission mode to send a flow control instruction for flow control over a congestion state if an event, such as the occurrence of a congestion or the removal of a congestion, occurs, and an autonomous transmission mode to select one of a plurality of congestion states at present in each period and autonomously send a flow control instruction corresponding to the selected congestion state, the flow control instruction sender being arranged to preferentially send a flow control instruction in the normal transmission mode in which a congestion actually occurs or is actually removed, when timings of the normal transmission mode and the autonomous transmission mode coincide with each other, and an error-correcting code adder for adding an error-correcting code to the cells to which the flow control instruction is assigned; and a circuit controller having a cell sender for writing a variable-length packet into a packet/cell conversion buffer, reading cells from the packet/cell conversion buffer based on a flow control instruction, and sending the cells for the respective circuits to the main switch controller, an error-correcting processor for receiving the cells to which the flow control instruction is assigned and correcting an error of the cells, a flow control instruction receiver for performing flow control by stopping sending data and sending data based on a flow control instruction, and a packet sender for converting cells into a packet and sending the packet to a packet circuit, wherein the normal transmission mode and the autonomous transmission mode work independently, and when the timings of the normal transmission mode and the autonomous transmission mode coincide each other, the flow control instruction sender preferentially sends a flow control instruction for the congestion state in the normal transmission mode.

10. The transmission system according to claim 9, wherein the flow control instruction sender sends a flow control instruction corresponding to either one of a queue-level congestion state with respect to a single queue or a line-level congestion state with respect to all queues.

11. The transmission system according to claim 9, wherein the flow control instruction receiver activates a timer if the flow control instruction has contents to stop sending data, and autonomously cancels the stoppage of sending data if a flow control instruction indicative of a cancellation of the stoppage of sending data is not received after elapsed of a given time measured by the timer.

12. The transmission system according to claim 11, wherein if the flow control instruction receiver autonomously cancels the stoppage of sending data, the flow control instruction receiver sends a signal indicative of the autonomous cancellation of the stoppage of sending data to an upper-level system.

13. The transmission system according to claim 11, wherein if the flow control instruction receiver receives a flow control instruction corresponding to a congestion state of the same contents successively a predetermined number of times, the flow control instruction receiver stops the autonomous cancellation of the stoppage of sending data.

14. The transmission system according to claim 11, wherein if a flow control instruction sender transmission apparatus is of a duplex structure having two systems, the flow control instruction receiver activates the autonomous cancellation of the stoppage of sending data upon switching between the two systems.

15. The transmission system according to claim 9, wherein the flow control instruction receiver sends contents of a flow control instruction recognized thereby to the flow control instruction sender, the flow control instruction sender autonomously sends a flow control instruction relative to a congestion state different from the sent contents of the flow control instruction, and when the timings of the normal transmission mode and the autonomous transmission mode coincide with each other, the flow control instruction sender preferentially sends a flow control instruction in the normal transmission mode.

16. A main switching controller for switching cells under flow control, comprising:

a cell receiver for receiving fixed-length cells sent from respective circuits, multiplexing the cells, and buffering the multiplexed cells in a common buffer;

a cell reader for reading the multiplexed cells from the common buffer and switching the cells;

a buffer monitor for monitoring a congestion state from a buffered state of the cells and generating a congestion state flag;

a demultiplexer for demultiplexing the multiplexed cells for the respective circuits;

a flow control instruction sender for generating a flow control instruction based on the congestion state flag and assigning the flow control instruction to cells, the flow control instruction sender having at least one of two functions including a normal transmission mode to send a flow control instruction for flow control over a congestion state if an event, such as the occurrence of a congestion or the removal of a congestion, occurs, and an autonomous transmission mode to select one of a plurality of congestion states at present in each period and autonomously send a flow control instruction corresponding to the selected congestion state, the flow control instruction sender being arranged to preferentially send a flow control instruction in the normal transmission mode in which a congestion actually occurs or is actually removed, when timings of the normal transmission mode and the autonomous transmission mode coincide with each other; and an error-correcting code adder for adding an error-correcting code to the cells to which the flow control instruction is assigned, wherein the normal transmission mode and the autonomous transmission mode work independently, and when the timings of the normal transmission mode and the autonomous transmission mode coincide each other, the flow control instruction sender preferentially sends a flow control instruction for the congestion state in the normal transmission mode.

17. A method of performing flow control by sending a flow control instruction in an event format, comprising the steps of:

providing at least one of two functions including a normal transmission mode to send a flow control instruction for flow control over a congestion state if an event, such as the occurrence of a congestion or the removal of a congestion, occurs, and an autonomous transmission mode to select one of a plurality of congestion states at present in each period and autonomously send a flow control instruction corresponding to the selected congestion state;

preferentially sending a flow control instruction in the normal transmission mode in which a congestion actually occurs or is actually removed, when timings of the normal transmission mode and the autonomous transmission mode coincide with each other; and receiving a flow control instruction and performing flow control by stopping sending data and sending data, wherein the normal transmission mode and the autonomous transmission mode work independently.

18. The method according to claim 17, comprising the step of sending a flow control instruction corresponding to either one of a queue-level congestion state with respect to a single queue or a line-level congestion state with respect to all queues.

19. The method according to claim 17, comprising the steps of activating a timer if the flow control instruction has contents to stop sending data, and autonomously canceling the stoppage of sending data if a flow control instruction indicative of a cancellation of the stoppage of sending data is not received after elapsed of a given time measured by the timer.

20. The method according to claim 19, comprising the step of, if the stoppage of sending data is autonomously canceled, sending a signal indicative of the autonomous cancellation of the stoppage of sending data to an upper-level system.

21. The method according to claim 19, comprising the step of, if a flow control instruction corresponding to a congestion state of the same contents is received successively a predetermined number of times, stopping the autonomous cancellation of the stoppage of sending data.

22. The method according to claim 19, comprising the step of, if an apparatus for sending a flow control instruction is of a duplex structure having two systems, activating the autonomous cancellation of the stoppage of sending data upon switching between the two systems.

23. The method according to claim 17, wherein an apparatus for receiving a flow control instruction sends contents of a flow control instruction recognized thereby to an apparatus for sending a flow control instruction, the apparatus for sending a flow control instruction autonomously sends a flow control instruction relative to a congestion state different from the sent contents of the flow control instruction, and when the timings of the normal transmission mode and the autonomous transmission mode coincide with each other, the apparatus for sending a flow control instruction preferentially sends a flow control instruction in the normal transmission mode.

* * * * *